US007247092B2

(12) United States Patent
Jarvis et al.

(10) Patent No.: US 7,247,092 B2
(45) Date of Patent: Jul. 24, 2007

(54) GAMING DEVICE HAVING A MULTIPLIER POKER GAME

(75) Inventors: Eugene P. Jarvis, Park Ridge, IL (US); Andrew W. Eloff, Evanston, IL (US)

(73) Assignee: IGT, Reno, NV (US)

( * ) Notice: Subject to any disclaimer, the term of this patent is extended or adjusted under 35 U.S.C. 154(b) by 504 days.

(21) Appl. No.: 10/458,809

(22) Filed: Jun. 9, 2003

(65) Prior Publication Data

US 2004/0248641 A1 Dec. 9, 2004

(51) Int. Cl.
*A63F 9/24* (2006.01)
*A63F 13/00* (2006.01)

(52) U.S. Cl. ............................ 463/13; 463/25; 463/42; 273/292

(58) Field of Classification Search ..................... None
See application file for complete search history.

(56) References Cited

U.S. PATENT DOCUMENTS

| | | | |
|---|---|---|---|
| 4,743,022 | A | 5/1988 | Wood |
| 5,046,736 | A | 9/1991 | Bridgeman et al. |
| 5,255,915 | A | 10/1993 | Miller |
| 5,280,915 | A | 1/1994 | Groussman |
| 5,288,082 | A | 2/1994 | Marquez |
| 5,294,120 | A | 3/1994 | Schultz |
| 5,393,057 | A | 2/1995 | Marnell, II |
| 5,415,404 | A | 5/1995 | Joshi et al. |
| 5,456,465 | A | 10/1995 | Durham |
| 5,489,101 | A | 2/1996 | Moody |
| 5,531,448 | A | 7/1996 | Moody |
| 5,564,701 | A | 10/1996 | Dettor |
| 5,718,631 | A | 2/1998 | Invencion |
| 5,732,948 | A | 3/1998 | Yoseloff |
| 5,732,950 | A | 3/1998 | Moody |
| 5,755,621 | A | 5/1998 | Marks et al. |

(Continued)

FOREIGN PATENT DOCUMENTS

AU 199716432 B2 9/1997

(Continued)

OTHER PUBLICATIONS

American Thunder Screen Shots written by IGT, published in 1998.

(Continued)

*Primary Examiner*—Mark Sager
(74) *Attorney, Agent, or Firm*—Bell, Boyd & Lloyd LLP

(57) ABSTRACT

A video poker gaming device, a method of operating a gaming device and a method of playing a poker game including a plurality of cards displayed to a player where the cards are drawn from a deck of fifty-two cards including at least one modifier card. The gaming device deals a first draw of the cards to form a player's hand. Any multiplier cards in the player's hand are replaced by a non-multiplier card. The gaming device enables the player to hold any of the cards in the hand and then determines if any winning card combinations are indicated by the non-multiplier cards in the hand. An award associated with any indicated winning card combinations is provided to the player. The award is multiplied by the multipliers associated with any multiplier cards in the player's hand.

169 Claims, 20 Drawing Sheets

U.S. PATENT DOCUMENTS

| | | | | |
|---|---|---|---|---|
| 5,816,916 | A | 10/1998 | Moody | |
| 5,823,873 | A | 10/1998 | Moody | |
| 5,823,874 | A | 10/1998 | Adams | |
| 5,848,932 | A | 12/1998 | Adams | |
| 5,919,088 | A | 7/1999 | Weiss | |
| 5,947,821 | A * | 9/1999 | Stone | 463/13 |
| 5,954,335 | A | 9/1999 | Moody | |
| 6,004,207 | A | 12/1999 | Wilson, Jr. et al. | |
| 6,007,066 | A | 12/1999 | Moody | |
| 6,059,289 | A | 5/2000 | Vancura | |
| 6,062,979 | A | 5/2000 | Inoue | |
| 6,089,978 | A | 7/2000 | Adams | |
| 6,098,985 | A | 8/2000 | Moody | |
| 6,110,040 | A | 8/2000 | Sanduski et al. | |
| 6,149,521 | A | 11/2000 | Sanduski | |
| 6,159,097 | A | 12/2000 | Gura | |
| 6,165,069 | A | 12/2000 | Sines et al. | |
| 6,196,918 | B1 | 3/2001 | Miers et al. | |
| 6,206,374 | B1 | 3/2001 | Jones | |
| 6,224,483 | B1 | 5/2001 | Mayeroff | |
| 6,231,442 | B1 | 5/2001 | Mayeroff | |
| 6,238,288 | B1 | 5/2001 | Walker et al. | |
| 6,248,016 | B1 | 6/2001 | Walker et al. | |
| 6,309,300 | B1 | 10/2001 | Glavich | |
| 6,328,649 | B1 | 12/2001 | Randall et al. | |
| 6,334,814 | B1 | 1/2002 | Adams | |
| 6,340,158 | B2 | 1/2002 | Preice et al. | |
| 6,347,996 | B1 | 2/2002 | Gilmore et al. | |
| 6,398,218 | B1 | 6/2002 | Vancura | |
| 6,406,369 | B1 | 6/2002 | Baerlocher et al. | |
| 6,413,161 | B1 * | 7/2002 | Baerlocher et al. | 463/20 |
| 6,416,408 | B2 | 7/2002 | Tracy et al. | |
| 6,419,579 | B1 | 7/2002 | Bennett | |
| 6,454,651 | B1 | 9/2002 | Yoseloff | |
| 6,471,208 | B2 | 10/2002 | Yoseloff et al. | |
| 6,481,713 | B2 | 11/2002 | Perrie et al. | |
| 6,561,904 | B2 | 5/2003 | Locke et al. | |
| 6,719,630 | B1 | 4/2004 | Seelig et al. | |
| 6,857,957 | B2 | 2/2005 | Marks et al. | |

FOREIGN PATENT DOCUMENTS

| | | | |
|---|---|---|---|
| AU | A-50327/96 | | 10/1997 |
| AU | A-63553/98 | | 10/1998 |
| EP | 0798676 | A1 | 10/1997 |
| EP | 0874337 | A1 | 10/1998 |
| EP | 0 944 030 | A2 | 3/1999 |
| EP | 0 926 645 | A | 6/1999 |
| GB | 2328311 | A | 2/1999 |
| WO | WO 0012186 | | 3/2000 |

OTHER PUBLICATIONS

Bally Slot Machines Electro-Mechanicals 1964-1980 Book [In Part], Revised 3rd Edition written by Marshall Fey.
Bonus Times Article written by Strictly Slots, published in 2000.
Field Testing New Slots Article, written by Strictly Slots, published in Jul. 2000.
Good Times Advertisement written by International Game Technology published in 1999.
Leopard Spots™ (website) written by www.igt.com, printed Mar. 21, 2001.
Mega Multiplier® (website) written by www.wmsgaming.com, printed May 22, 2001.
Polly & Roger Advertisement written by VLC, Inc., published in 2000.
Take Your Pick Article written by Strictly Slots, published in Mar. 2001.
Top Cat Advertisement written by WMS Gaming, Inc., published prior to 2000.
Treasure Wheel/Treasure Tunnel Advertisement written by Sigma Game, Inc., published prior to 2000.
X Factor Advertisement and Website Page written by WMS Gaming, Inc., published in 1998.
Yahtzee Video Game Advertisement, written by Mikohn Winning Solutions Worldwide, published 1999.

* cited by examiner

FIG. 3B 108 110

| COMBINATION | AWARD |
|---|---|
| ROYAL FLUSH | 500 |
| STRAIGHT FLUSH | 250 |
| FOUR OF A KIND | 150 |
| FULL HOUSE | 100 |
| FLUSH | 75 |
| STRAIGHT | 50 |
| THREE OF A KIND | 25 |
| TWO PAIR | 10 |
| PAIR (JACKS OR BETTER) | 5 |
| NON-WINNING HAND | 0 |

FIG. 6B

| MULTIPLIER (306) | PROBABILITY (308) |
|---|---|
| 2X | 40% |
| 3X | 25% |
| 4X | 15% |
| 5X | 12% |
| 6X | 5% |
| 7X | 2% |
| 8X | 1% |

GAMING DEVICE HAVING A MULTIPLIER POKER GAME

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming machine manufacturers constantly strive to make wagering gaming machines that maximize enjoyment and excitement for players. Thus, manufacturers create gaming machines that include several different types of wagering games. One such wagering game is video draw poker. Most video draw poker gaming machines implement conventional poker rules by dealing five initial cards face up from a standard deck of fifty-two cards and allowing the player to hold any number of the initial cards for a subsequent draw. The player can press a draw button, which causes the non-held cards to be randomly replaced with new cards from the deck. The player is provided an award for winning combinations of cards (i.e., a winning hand), if any, according to a payout table.

Games that provide players with large awards or the potential to win large awards are especially attractive to players. One way that gaming device manufacturers provide larger awards to players is by using multipliers. A multiplier increases the award amount proportionally to the value of the multiplier. For example, a "2×" multiplier causes a payment to the player of twice the normal award value. A "3×" multiplier causes a payment to the player of three times the normal award value. Thus, a multiplier substantially increases a player's award.

It should be appreciated that multipliers may substantially elevate award returns and increase player excitement and enjoyment. Players enjoy playing for large awards. Players also enjoy new and different games, including new and different poker games. Thus, it is desirable to provide a video poker game and a method of playing poker that includes multipliers and provides players with opportunities to obtain large awards.

SUMMARY OF THE INVENTION

The present invention provides a gaming device including a video or virtual poker game, a method of operating a gaming device and a method of playing a poker game which includes playing cards having at least one modifier card such as a multiplier card. The multiplier card increases a player's award in the game and increases a player's excitement and enjoyment of the game. In an alternative embodiment, the modifier such as the multiplier is not provided through a card, but is provided in another suitable manner as discussed herein.

In one embodiment, the gaming device includes a conventional deck of fifty-two virtual playing cards from which the gaming device draws cards to deal to a player in a hand and display on a display device. The gaming device may include one deck, two decks or any suitable number of decks of the virtual playing cards. It should be appreciated that although the present invention includes a conventional deck of fifty-two playing cards, any other suitable types of cards may be employed in the present invention. Additionally, the deck of virtual playing cards includes at least one modifier card such as a multiplier card. The gaming device also includes a multiplier display, a winning hand award display and a total award display for displaying the total multiplier, the winning hand award for a particular hand and the total accumulated award in the game, respectively.

In one embodiment, the gaming device includes a video draw poker game in which the gaming device displays a first draw of cards including a designated number of the cards from a conventional deck of fifty-two cards to a player, where the first draw of cards forms the player's hand. The number of cards in the first draw of cards may be randomly determined, pre-determined or determined in any suitable manner. If a multiplier card is displayed in the hand after the first draw, the multiplier card is replaced with a non-multiplier card from the deck of fifty-two cards. The gaming device then enables the player to hold or keep one or more of the cards in the hand by pressing or touching the cards on the display device. In another embodiment, the player presses inputs such as keys on a keypad, which correspond to each of the cards, to hold the cards in the hand. The held cards remain in the hand (i.e., the held cards are not replaced) and the gaming device performs a second draw of the cards where the second draw of cards replaces the non-held cards in the hand. It should be appreciated that any suitable number of draws may be provided to a player in the game. After the second draw of cards, the gaming device evaluates the card combination or the symbol combination indicated by the cards in the player's hand to determine if a winning combination of cards or a winning hand is indicated by the cards. If a winning hand is indicated by the cards, the gaming device provides the player with an award, which is displayed in a winning hand award display. The award is multiplied by a multiplier associated with the multiplier card if the multiplier card was displayed in the first draw of cards. The multiplied award, if any, is transferred to the player's total award and indicated in the total award display. If a multiplier card was not dealt to the player in the first draw of cards, the winning hand award is transferred directly to the total award display. When the game ends, the player receives the total award indicated by the total award display.

In another embodiment, the deck of fifty-two cards include a plurality of multiplier cards which are displayed to the player in one or more draws of the cards. In one embodiment, only the first or initial draw may include a multiplier card or cards. In another embodiment, a plurality of draws may include multiplier cards. In a further embodiment, all of the draws include multiplier cards. In one aspect of this embodiment, two or more multipliers associated with the multiplier cards dealt in a draw of cards are summed or added together to provide a total multiplier to a player for the game. In another aspect of this embodiment, the multipliers associated with two or more multiplier cards dealt in a draw of cards are multiplied together to provide a total multiplier to the player for the game. In either aspect, any award associated with winning card combinations are modified or multiplied by the total multiplier, if any, for the game. The multiplied award is transferred to the total award display and provided to the player at the end of the game.

In a further embodiment, the multiplier cards are specific cards such as the joker cards in the deck of playing cards. In this embodiment, a plurality of multipliers are associated with each of the joker cards in a game. Each multiplier is associated with a probability of being selected by the processor such that the multiplier is assigned or associated with a joker card based on the probabilities. If a joker card or joker cards are dealt in the first draw of cards which forms a player's hand, the gaming device randomly assigns a multiplier to each joker card (i.e., multiplier card) in the hand based on the probabilities. In one embodiment described above, the multipliers associated with the joker cards are summed together to provide a total multiplier for the game. Alternatively, the multipliers associated with the joker cards are multiplied together to provide the total multiplier for the game. The probabilities associated with the multipliers may be any suitable probabilities. It should be appreciated that the multiplier cards may be joker cards, or any other suitable card in a conventional deck of fifty-two cards.

In a further embodiment, the gaming device includes a video poker game which displays a plurality of playing card hands. Each hand is formed by randomly drawing cards from a conventional deck of fifty-two cards which includes at least one multiplier card. It should be appreciated that the gaming device may display two, three or any suitable number of playing card hands to the player. The number of playing card hands may be predetermined, randomly determined, based on a wager made by the player or determined in any suitable manner. In a first draw of the cards, the designated number of playing cards in each hand are dealt to the player. In one embodiment, the playing cards dealt to the player in each of the hands are the same cards. The player then chooses or picks the cards (i.e., touches the cards) in one of the hands, such as the first hand, to indicate the cards to be held in all of the hands.

In one embodiment, when a multiplier card is dealt to the player in the first draw of cards, the player can choose to hold the multiplier card or to not hold the multiplier card. If the player holds the multiplier card, the player receives the multiplier associated with only one of the held multiplier cards in the hands. In another embodiment, the player receives the summation of the multipliers associated with the held multiplier cards in each of the hands. Additionally, in one embodiment, the multiplier card may only be obtained in the first draw of cards. In another embodiment, the multiplier card may be obtained in any of the draws of the cards.

After the player picks the cards to be held in the hands, the gaming device provides a second draw of the cards to replace the non-held cards in each of the hands. The gaming device randomly replaces the non-held cards in each of the hands with cards randomly selected from the remaining cards in the card deck or set. Accordingly, the player has multiple opportunities based on the number of hands that the player is playing in the game, to obtain a winning card hand. In another embodiment, the hands displayed to the player after the first draw include different cards and the gaming device enables the player to independently pick the cards to be held in each of the hands.

In one embodiment, the gaming device determines if the non-multiplier cards in each of the hands forms a winning card combination or winning hand. An award is provided to the player for any winning card combinations in the hands. In one embodiment, the player receives the sum of the awards associated with any winning hands, if there is more than one winning hand in the game. In another embodiment, the player only receives the highest award associated with the winning hands, if any, in the game. The gaming device then determines a total multiplier based on the multipliers associated with the multiplier cards, if any, included in the card hands. The accumulated award associated with any winning card hands is multiplied by the total multiplier to provide a total award for the game. The total award is then transferred to the total award display.

It should be appreciated that the present invention may be employed in a draw video poker game, stud video poker game or any suitable type of video poker game. It should also be appreciated that the game of the present invention may be employed as a table card game, instead of a machine implemented game. It should further be appreciated that the present invention may be employed as a primary game or a secondary game of a wagering gaming device. It should also be appreciated that the present invention may be employed in another card game such as blackjack or other suitable games.

In an alternative embodiment of the present invention, the multiplier (or other suitable modifier) is not provided as part of the deck. In this embodiment, the occurrence of the multiplier is randomly determined to apply to a hand or not to apply to a hand.

The multiplier may be displayed to the player when the first cards are dealt to enable the player to know that the multiplier will apply to the hand if the player wins. In another embodiment, the multiplier may not be displayed until after the first draw. In a further embodiment, the multiplier may be provided in each hand. In this embodiment, the amount of the multiplier is randomly determined and therefore may vary with each hand. It should be appreciated that the amount of the multiplier may be randomly determined, pre-determined or determined in any suitable manner.

It is therefore an advantage of the present invention to provide a gaming device having a video poker game and a method of playing a poker game which includes a multiplier card wherein a player has an opportunity to obtain a potentially large award in the game.

Another advantage of the present invention is to provide a gaming device having a video poker game and a method of playing a poker game which include at least one deck of cards including a plurality of multiplier cards.

Another advantage of the present invention is to provide a gaming device including a video poker game and a method of playing a poker game that provide several opportunities to obtain relatively large awards by providing different methods of obtaining multiplier cards in the game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3B is a schematic of an award table associated with the embodiment of FIG. 3A.

FIG. 6B is a schematic of a multiplier table associated with the embodiment of FIG. 6A.

DETAILED DESCRIPTION OF THE INVENTION

Gaming Device and Electronics

Figure 1A:
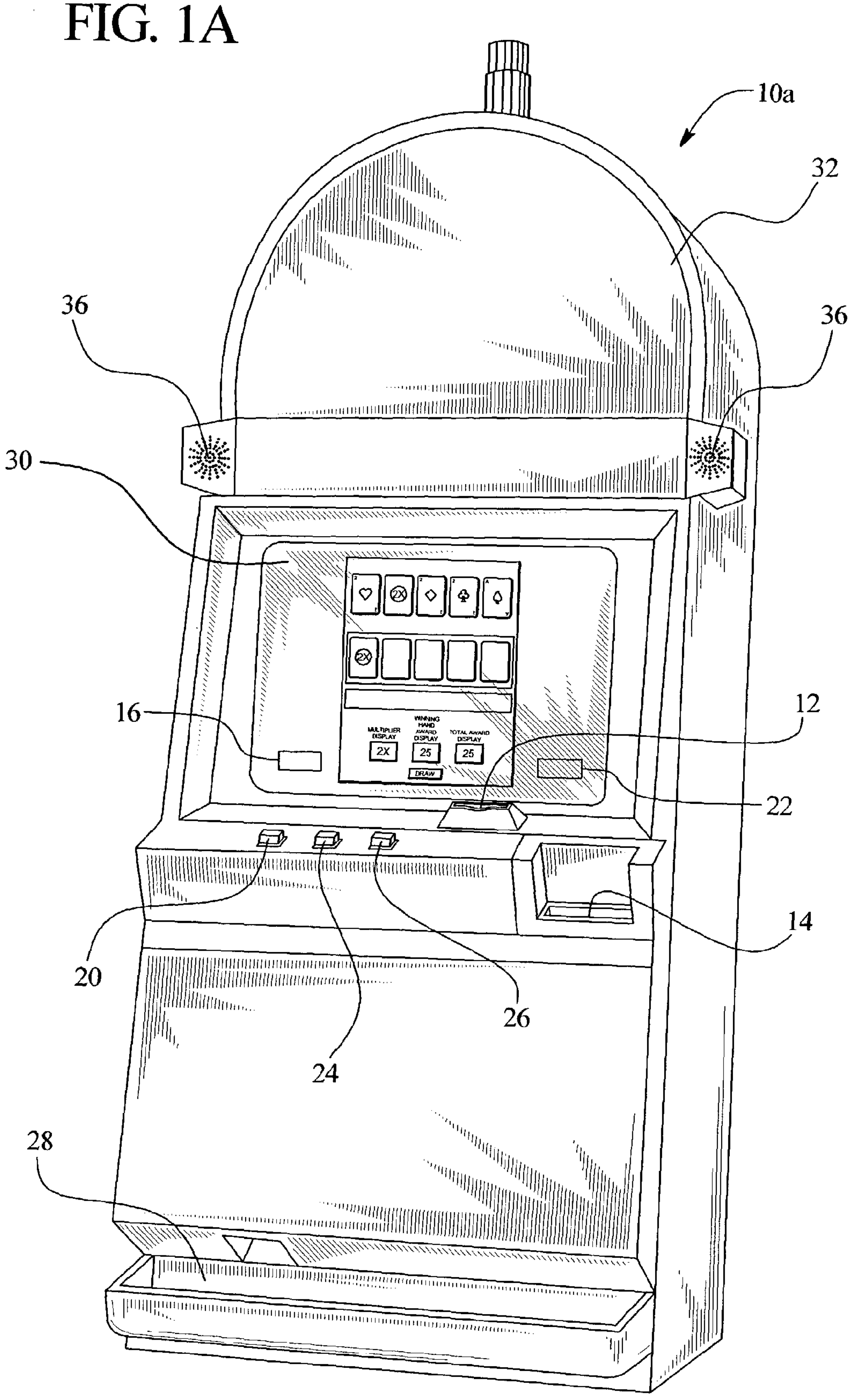
FIG. 1A is a front perspective view of one embodiment of the gaming device of the present invention.
Figure 1B:
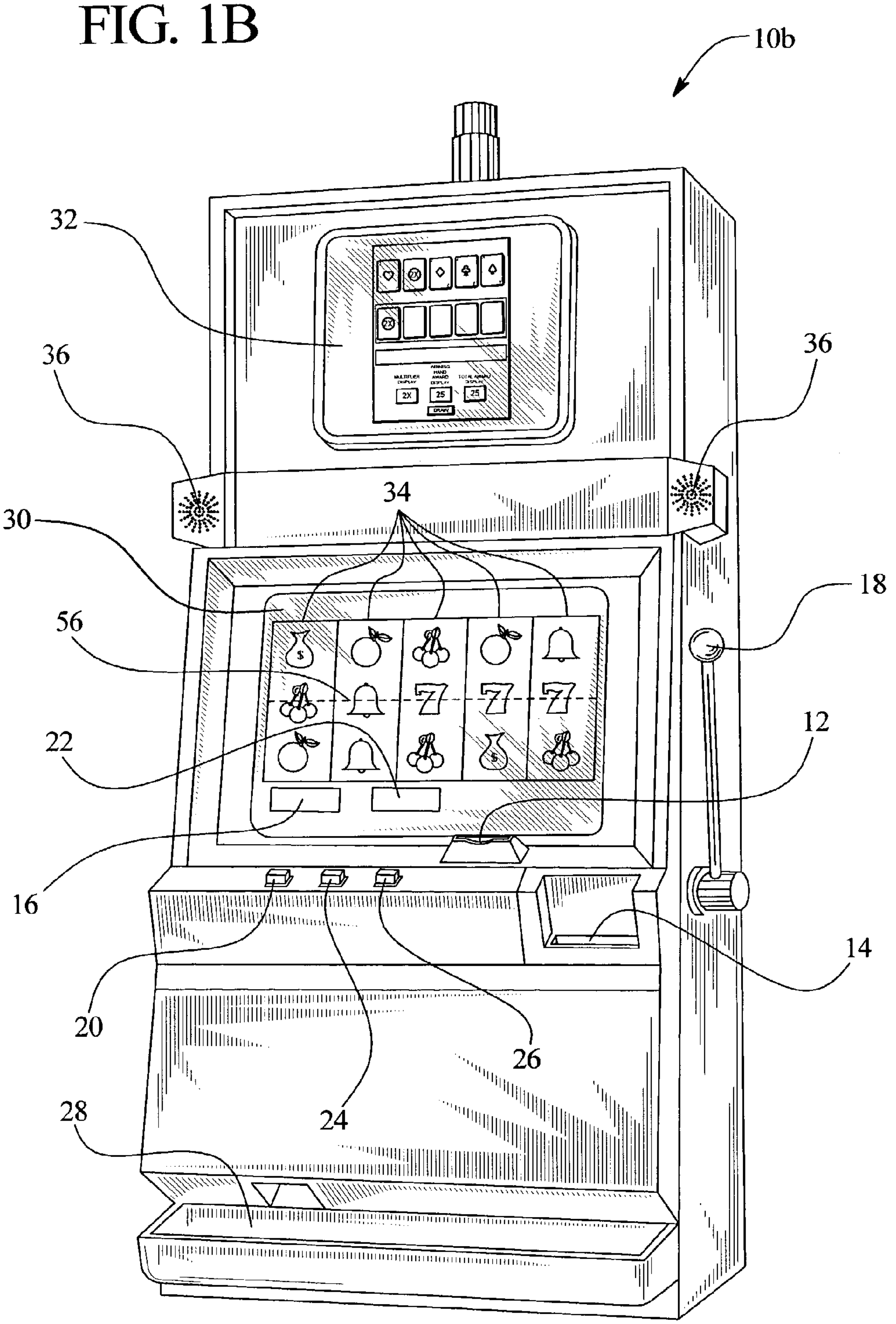
FIG. 1B is a front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is in one embodiment, a video poker game constructed so that a player can operate it while standing or sitting, and gaming device 10 is preferably mounted on a console. However, it should be appreciated that gaming device 10 can be constructed as a pub-style tabletop game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device, which a player can use in a desktop or laptop personal computer or other computerized platform.

Gaming device 10 can incorporate any primary or base game and any secondary or bonus triggering events and any suitable bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by a selector such as pushing play or draw button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet for a single poker hand by one credit each time the player pushes the bet one button 24. Alternatively, the player can play multiple poker hands by pushing the bet one button 24 a number of times equal to the number of desired poker hands in a game up to a designated number of hands. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. A display device can be any viewing surface such as glass, a video monitor or screen, a liquid crystal display or any other display mechanism.

Figure 2:
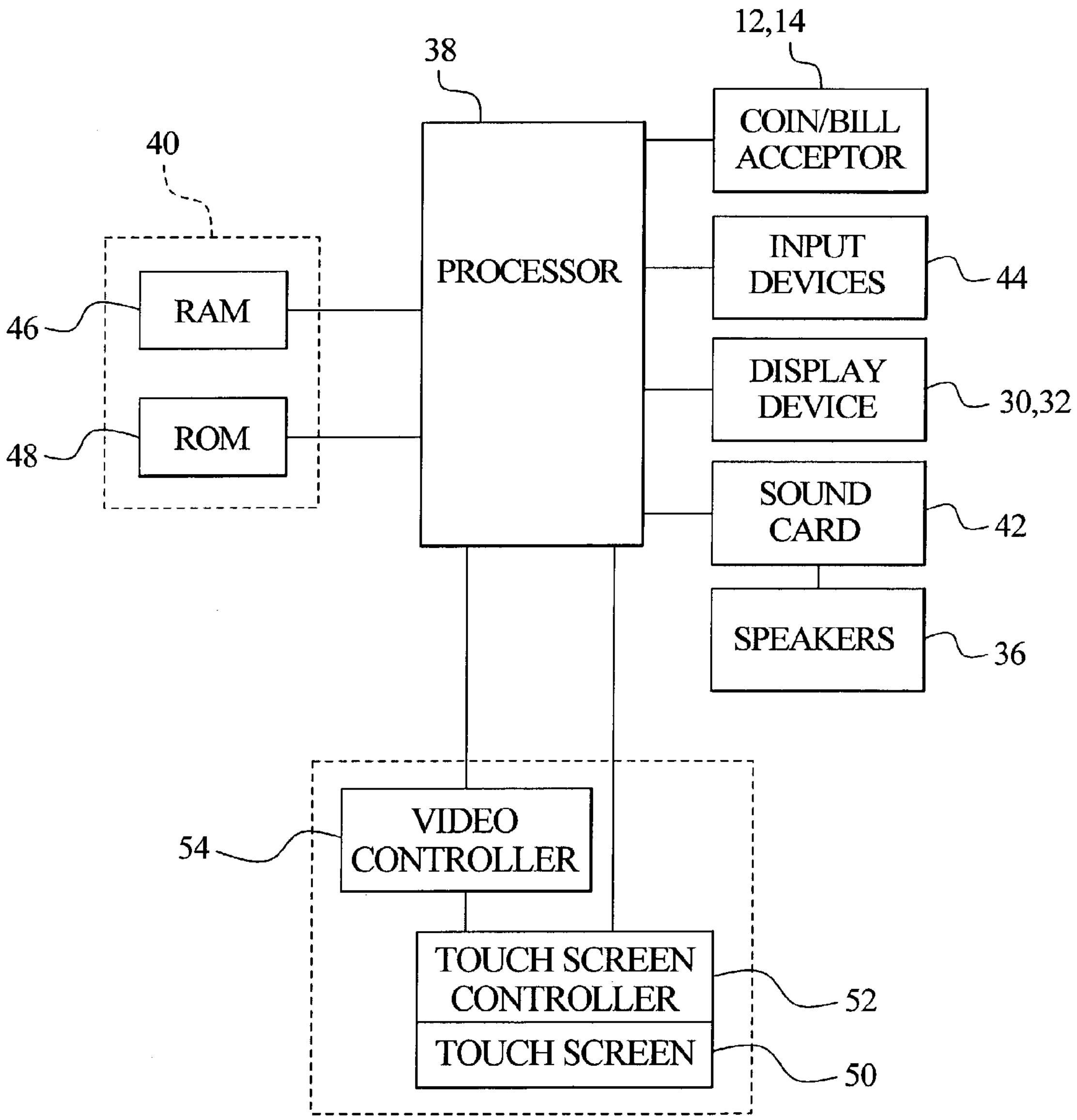
FIG. 2 is a schematic block diagram of the electronic configuration of one embodiment of the gaming device of the present invention.

As illustrated in FIG. 2, the general electronic configuration of gaming device 10 generally includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then push the play or draw button 20. The gaming device will then provide the player with a first draw of playing cards from a plurality of virtual playing cards in a conventional fifty-two card deck. As long as the player has credits remaining, the player can press the play or draw button 20 and the gaming device will provide additional card hands to the player. Depending upon the combination of the playing cards in each hand or the combination of the symbols on the playing cards in each hand, the player may or may not win additional credits.

Multiplier Card Game

One embodiment of the present invention is directed to a gaming device including a video poker game, a method of operating a gaming device and a method of playing a poker game wherein the playing cards in the games include at least one modifier card such as a multiplier card. In one embodiment, the gaming device includes a video poker game that displays a plurality of virtual playing cards randomly selected from a conventional deck or set of fifty-two playing cards. The displayed cards form a player's poker hand or hand in the game. If the player's hand includes a multiplier card, the multiplier associated with the multiplier card is used to multiply an award, if any, associated with any winning card combinations associated with the player's hand in the game. Thus, a player has an opportunity to obtain a large award in the game by obtaining the multiplier card. The present invention therefore increases the excitement and enjoyment of the game.

Figure 3A:
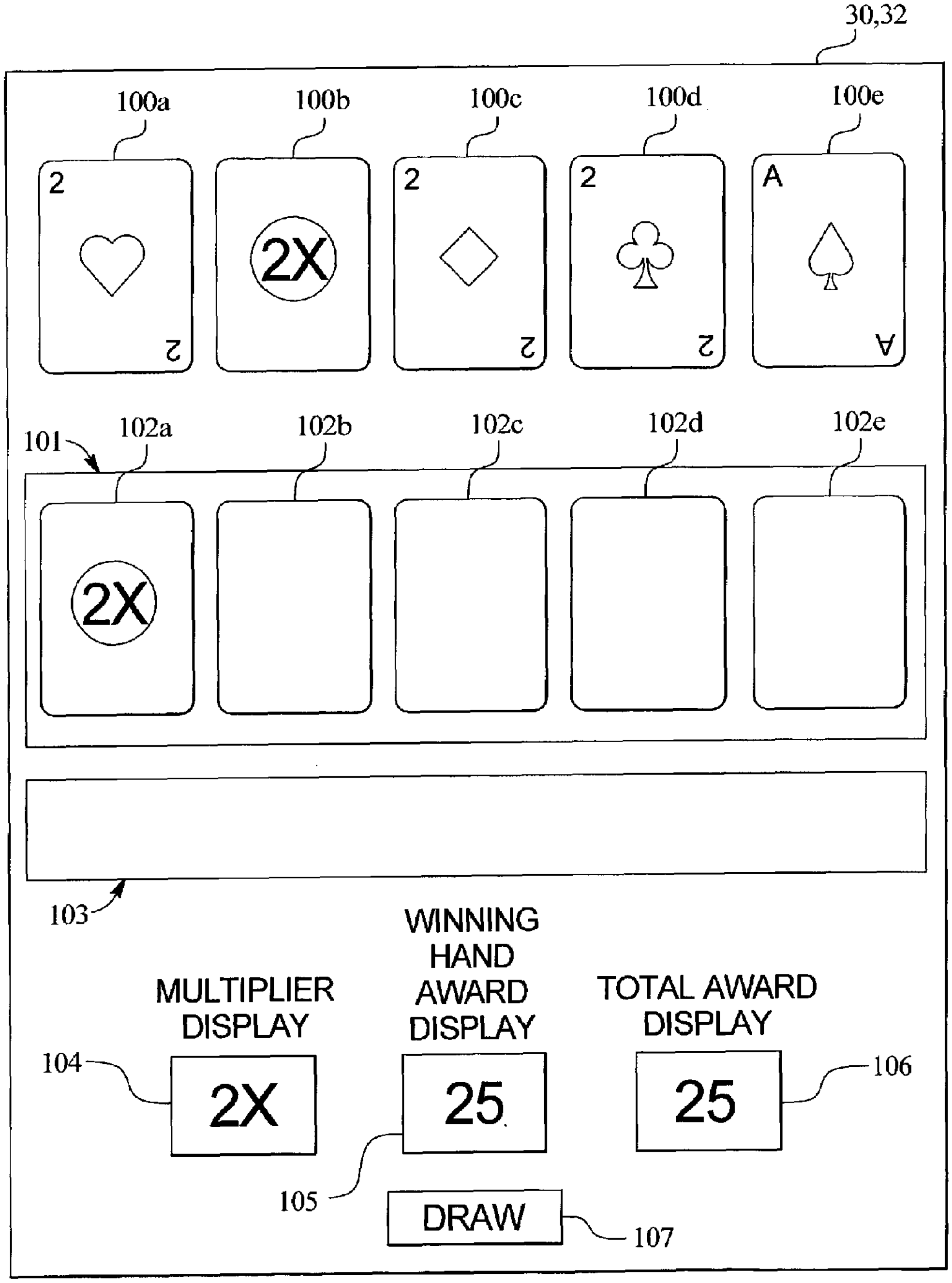
FIG. 3A is an enlarged elevation view of one embodiment of the gaming device of the present invention.

Referring now to FIG. 3A, one embodiment of the gaming device 10 includes a video draw poker game in which a plurality of virtual playing cards such as playing cards 100*a*, 100*b*, 100*c*, 100*d* and 100*e* are displayed to a player in an initial or first draw of cards from a conventional deck or set of fifty-two playing cards. The playing cards each include a card suit such as a spade, a heart, a diamond or a club and a number, or a face card such as a Jack, Queen, King or Ace. In one embodiment, the cards also include at least one Joker card. Additionally, the cards include at least one modifier card such as the multiplier card 100*b*, which includes a multiplier of 2×. The multiplier may be any suitable multiplier such as 2×, 3× or 4×. Also, the multiplier may be randomly determined, predetermined or determined in any other suitable manner. A multiplier card display 101 displays any multiplier cards that appear in the player's hand. The multiplier card display 101 includes multiplier card positions 102*a*, 102*b*, 102*c*, 102*d* and 102*e*. When a multiplier card or multiplier cards appear in a player's hand, the multiplier card or cards are transferred to the multiplier card display 101 and placed in one of the multiplier card positions 102. In this manner, the gaming device displays the multiplier card or cards to the player so that the player can keep track of the multiplier card or cards obtained in the game. Furthermore, a multiplier display 104 displays the multiplier associated with any multiplier cards obtained by the player in the game. A winning hand award display 105 displays the award associated with any winning symbol combinations on the cards or winning hands obtained by the player in a game. The award displayed in the winning hand award display 105 is multiplied by the multiplier displayed by the multiplier display 104 to provide a total award to the player for the game. A total award display 106 displays the total award accumulated by the player in the game. The total award indicated by the total award display 106 at the end of the game is the award provided to the player.

In one embodiment, the video poker game of the present invention includes a video draw poker game (such as a five or seven card draw game). In the draw poker game, the processor causes the display device to randomly display a designated number of cards such as cards 100*a*, 100*b*, 100*c*, 100*d* and 100*e* to a player. It should be appreciated that any number of cards may be dealt to the player in the game based on the type of poker game that is being implemented. For example, in a five card draw game, the processor deals five cards to the player which forms the player's hand. In this embodiment, the gaming device deals an initial or first draw of the cards to the player where the cards form the player's poker hand or hand in the game. If a multiplier card, such as card 100*b*, appears in the player's hand, the gaming device displays the multiplier associated with the multiplier card 100*b* in one of the multiplier locations 102*a*, 102*b*, 102*c*, 102*d* or 102*e* in the multiplier card display 101. In this embodiment, the multiplier cards are not a part of the card hand or poker hand or hand. Instead, the gaming device replaces each of the multiplier cards in the hand, if any, with a non-multiplier card randomly selected from the remaining cards in the deck of fifty-two cards. As a result, the multiplier card does not factor into the poker hand when determining whether a winning card combination or winning hand is indicated by the cards in the hand.

When the multiplier card or cards, if any, are replaced with non-multiplier cards, the gaming device enables the player to pick one or more of the cards in the hand to hold (i.e., to keep in the hand). In one embodiment, the gaming device enables the player to touch or press the actual cards on the display device to indicate which cards the player desires to hold in the card hand. In another embodiment, a keypad or similar input is connected to the display and the player presses corresponding buttons, inputs or keys on the keypad to indicate which cards the player wishes to hold in the hand. After the player indicates which cards the player wishes to hold in the hand, the gaming device deals an additional or second draw of cards to replace the non-held cards in the card hand. The second draw of cards are randomly selected by the processor from the deck or set of fifty-two virtual playing cards (excluding the other cards dealt to the player or in the player's hand). Therefore, the processor randomly assigns cards to replace the non-held cards in the hand.

The gaming device then determines if the cards in the player's hand include a winning combination of symbols on the cards or a winning combination of cards such as a winning hand as indicated by the designated winning hands displayed in the award table in FIG. 3B. If the player's hand indicates or includes a winning hand as indicated by the designated winning hands in column 108 in FIG. 3B, the gaming device provides the award associated with the winning hand as indicated in column 110 in FIG. 3B. The winning hand award is then displayed in the winning hand award display 105 as shown in FIG. 3A. The winning hand award is multiplied by the multiplier, if any, indicated in the multiplier display 104. The multiplied award is then added to the total award, if any, indicated in the total award display 106. The total award indicated by the total award display 106 at the end of the game is the award provided to the player.

Although the present invention is directed to a draw poker game, it should be appreciated that the video poker game of the present invention may include any type of video poker game or poker games such as five card stud, five card draw, seven card stud, seven card draw or any suitable poker game. The gaming device preferably provides two draws from the deck of fifty-two playing cards in a game. However, it should be appreciated that any suitable number of draws may be employed in the game. Additionally, although the present embodiment is described with respect to one conventional playing card deck including fifty-two playing cards, it should be appreciated that any suitable number of conventional decks or sets of fifty-two playing cards may be employed in a game. It should also be appreciated that the present invention can also be employed as a table card game such as a card game dealt by a dealer and not necessarily implemented by a processor or implemented by a processor at a card table.

Figure 4A:
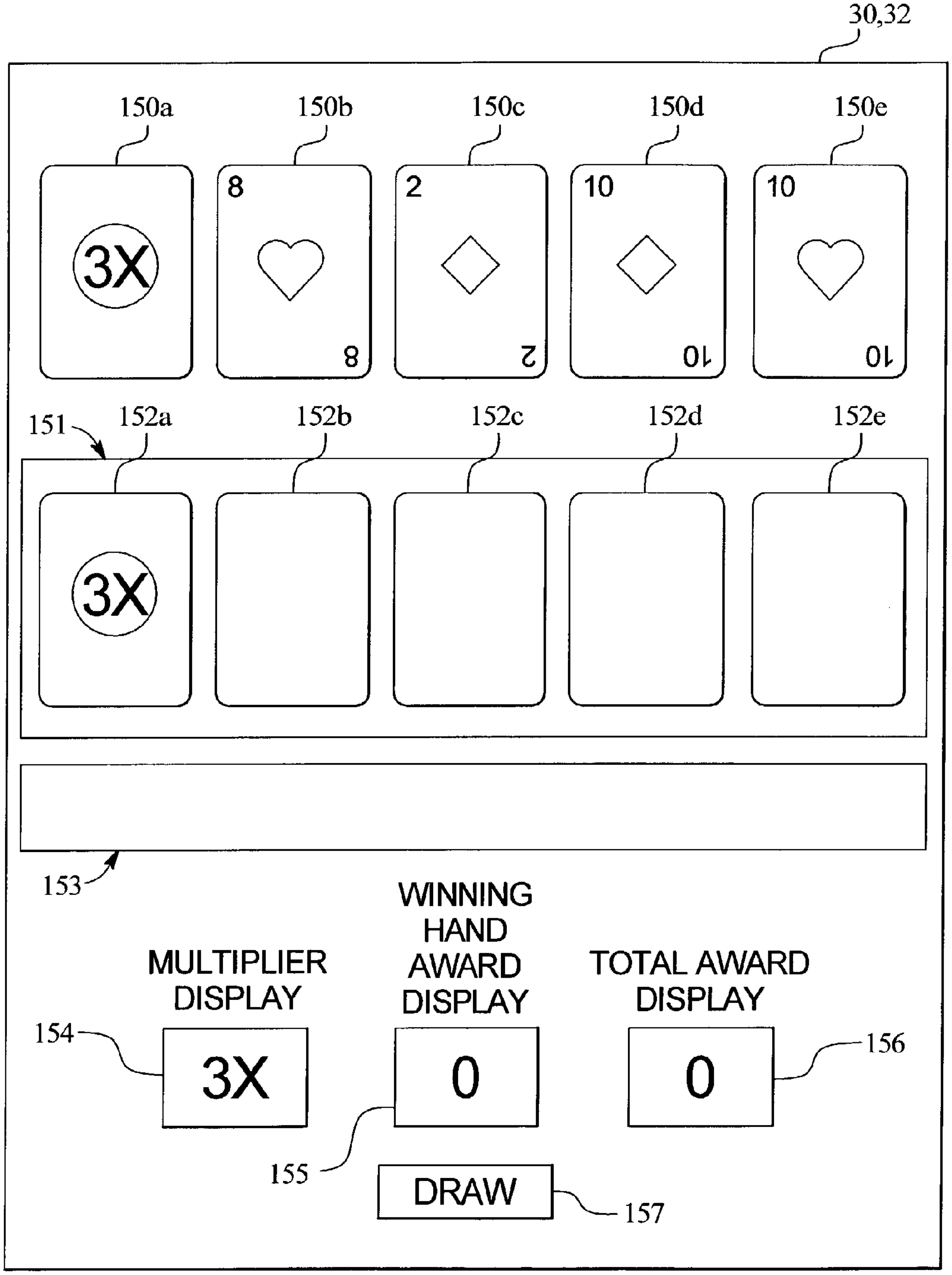
FIGS. 4A to 4D are enlarged front elevation views illustrating an example of the embodiment of FIGS. 3A and 3B.

Referring to FIGS. 4A to 4D, an example of the embodiment of FIGS. 3A and 3B is illustrated where the gaming device enables a player to play a video draw poker game. Specifically in this example, the video draw poker game is a five card draw game. As illustrated in FIG. 4A, the gaming device randomly deals an initial or first draw of five playing cards from a conventional deck of fifty-two cards to the player including cards 150*a*, 150*b*, 150*c*, 150*d* and 150*e*. Card 150*a* is a multiplier card, which includes a multiplier of 3×. The remaining cards 150*b*, 150*c*, 150*d* and 150*e* indicate an eight of hearts, a two of diamonds, a ten of diamonds, and a ten of hearts, respectively. Because a multiplier card is indicated in the player's hand formed by the first draw of cards, the multiplier card is transferred or displayed in the multiplier card display 151. In this example, the multiplier card 150*a* is transferred to the first multiplier card position or location 152*a*. It should be appreciated that the multiplier card may be displayed in any one of the positions in the multiplier card display 151. Additionally, the multiplier of 3× associated with the multiplier card 100*a* is displayed in the multiplier display 154. Because the player has not obtained an award in the game, the winning hand award display 155 and a total award display 156 indicate zero values or zero. In this example, the gaming device provides the player with two draws from the deck of fifty-two playing cards in the game. Additionally, a multiplier card may only be obtained in the first draw of the cards. It should be appreciated that one draw, a plurality of draws or all of the draws of cards in a game may include at least one multiplier card. Prior to the second draw, the gaming device enables the player to hold or keep one or more of the cards or none of the cards in the player's hand.

Figure 4B:
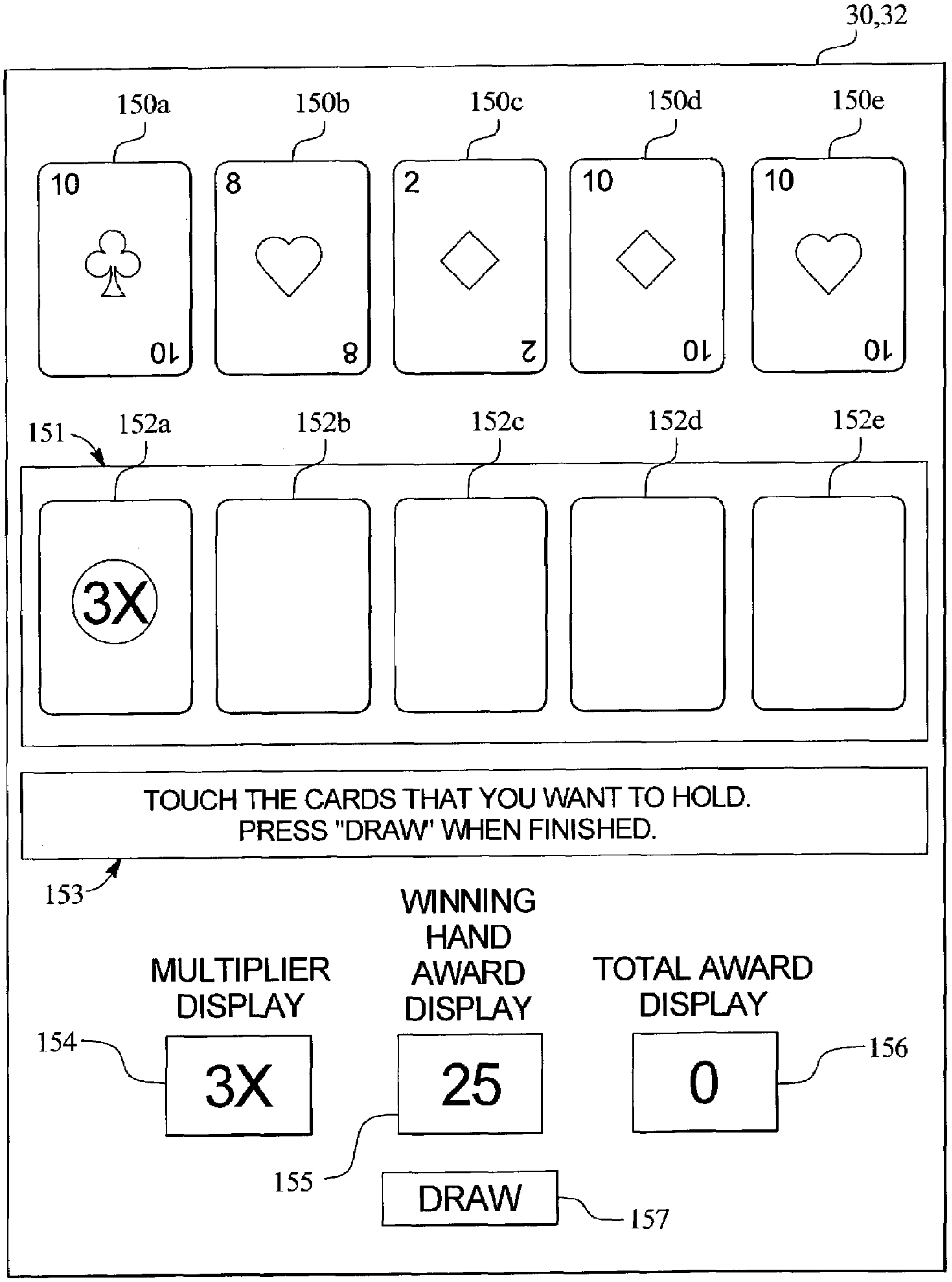

Referring to FIG. 4B, the gaming device replaces the multiplier card 150*a* with a non-multiplier card, which is the ten of clubs. As described above, the player cannot obtain a multiplier and in the second draw. The gaming device prompts or instructs the player to using the instruction display 153 to touch the cards that the player wants to hold or keep in the hand, if any. The instruction display further instructs the player to press the "draw" button when the player is finished. The "draw" button initiates the second draw or subsequent draws of the cards. The player's present hand indicates a winning combination of cards including three of a kind (i.e., three cards including the number ten). Therefore, the gaming device indicates the award associated with this winning hand, which is an award of twenty-five as indicated by the award table in FIG. 3B. This enables the player to know whether they have won any awards in the game and to further assist the player in determining which cards to hold or not to hold in the player's hand. If the player determines that the player wants to keep all of the cards that form the winning card hand including three of a kind, the player touches or presses all of the cards in the hand to indicate that the player wishes to hold or keep all of the cards in the hand. When the player is finished picking cards to hold, the gaming device performs a second draw of the playing cards, which randomly selects and replaces any of the non-held playing cards in the hand. The gaming device then multiplies the winning hand award of twenty-five by the multiplier of 3× to give the player a total award of seventy-five in the game.

Figure 4C:
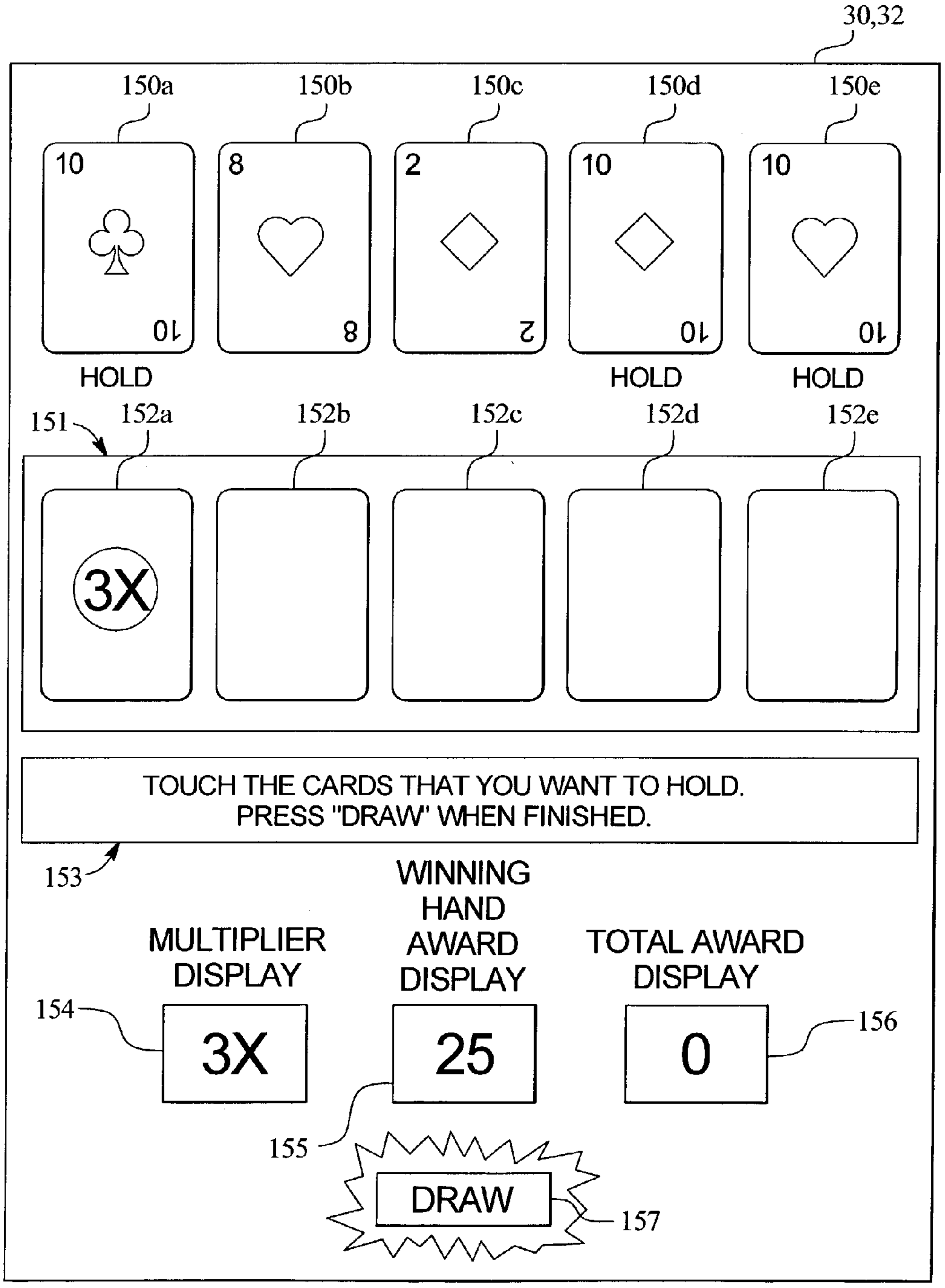

Referring to FIG. 4C, the player decides to continue to play the game and presses or touches cards 150*a*, 150*d* and 150*e*, which include the ten of clubs, ten of diamonds and ten of hearts, respectively. By holding only these cards, the player attempts to obtain additional cards which will provide a better winning hand than the three of a kind indicated by the player's hand after the first draw. Also by holding these cards, the player is guaranteed to obtain at least a winning hand including three of a kind. As illustrated in FIG. 4C, the player presses or touches cards 150*a*, 150*c* and 150*e* to hold or keep these cards and presses the selector or draw button 157 to indicate that the player is finished.

Figure 4D:
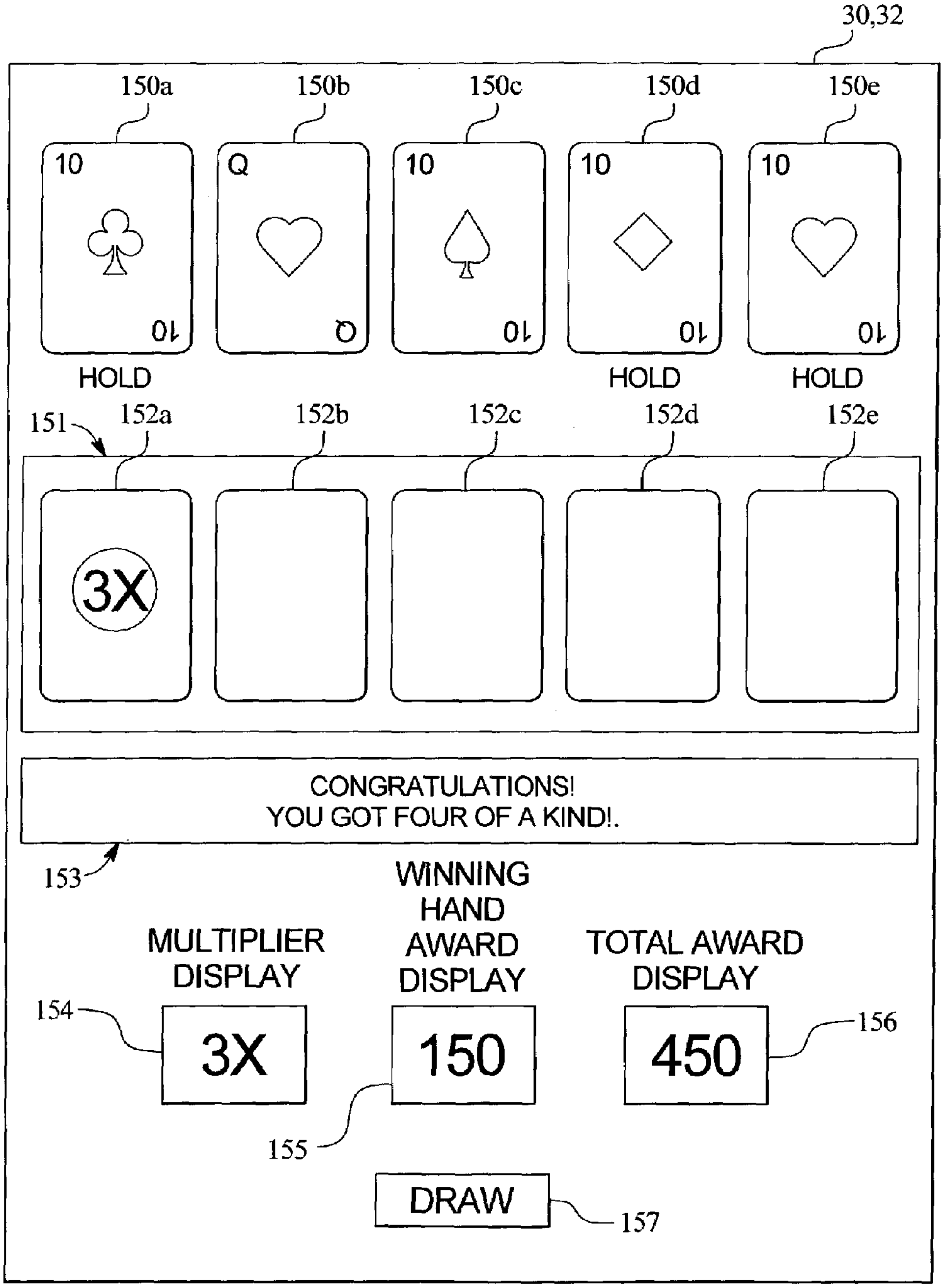

Referring to FIG. 4D, the gaming device deals a second draw of the playing cards to the player to randomly replace the cards in the hand that were not held by the player. The non-held cards are cards 150*b* and 150*c* (i.e., the cards that do not have the word "hold" located underneath the card). The gaming device randomly replaces the non-held cards 150*b* and 150*c* with the Queen of hearts and the ten of spades, respectively. The player now has a winning hand including four of a kind (i.e., cards 150*a*, 150*c*, 150*d* and 150*e* which each include the number ten). Thus, the player obtained a better or improved winning hand in the game. The instruction display 153 indicates to the player that the player obtained a winning hand including a combination of four of a kind. The award associated with a winning hand including four of a kind is an award of one hundred fifty as indicated by the award table in FIG. 3B. The winning hand award display 155 indicates the winning hand award of one hundred fifty. The winning hand award of one hundred fifty is multiplied by the multiplier of 3× indicated in the multiplier display 154 to provide the player with a total award of four hundred fifty as indicated by the total award display 156. Because there are only two draws of the playing cards in this game, the game ends after the second draw and the player receives the total award of four hundred fifty.

Figure 5A:
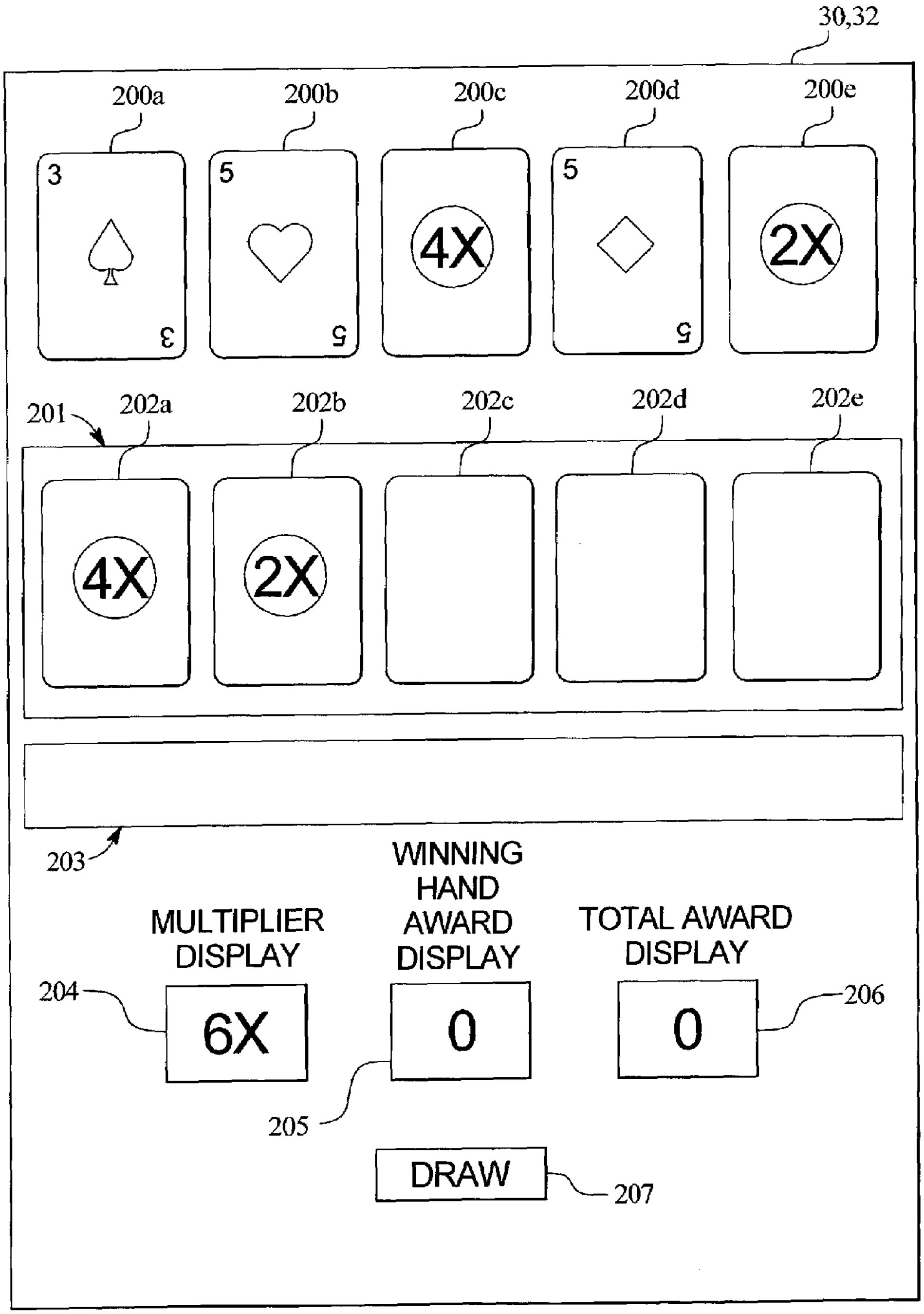
FIGS. 5A to 5C are enlarged elevation views of an example of another embodiment of the gaming device of the present invention in which the cards include a plurality of multiplier cards.
Figure 5B:
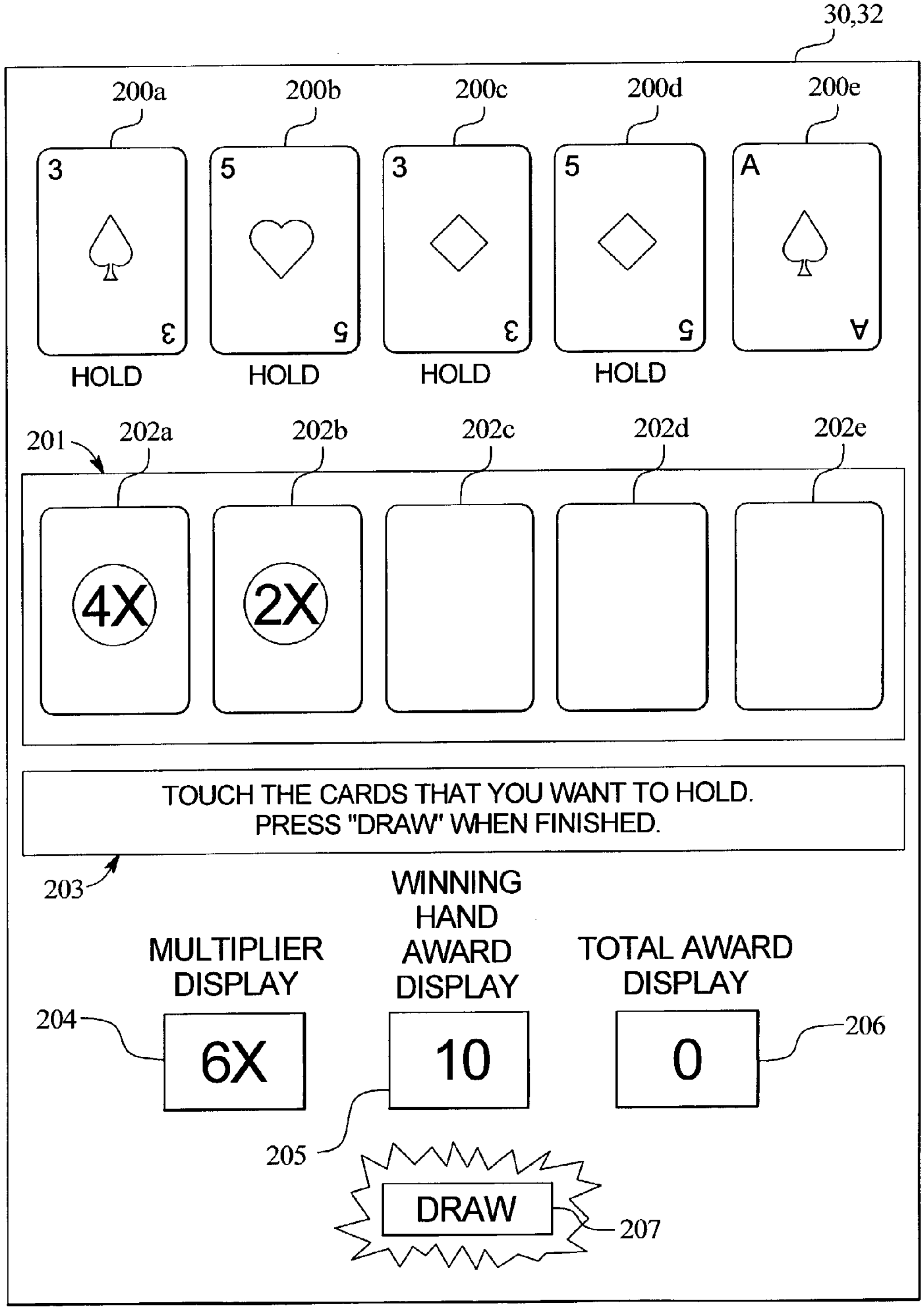
Figure 5C:
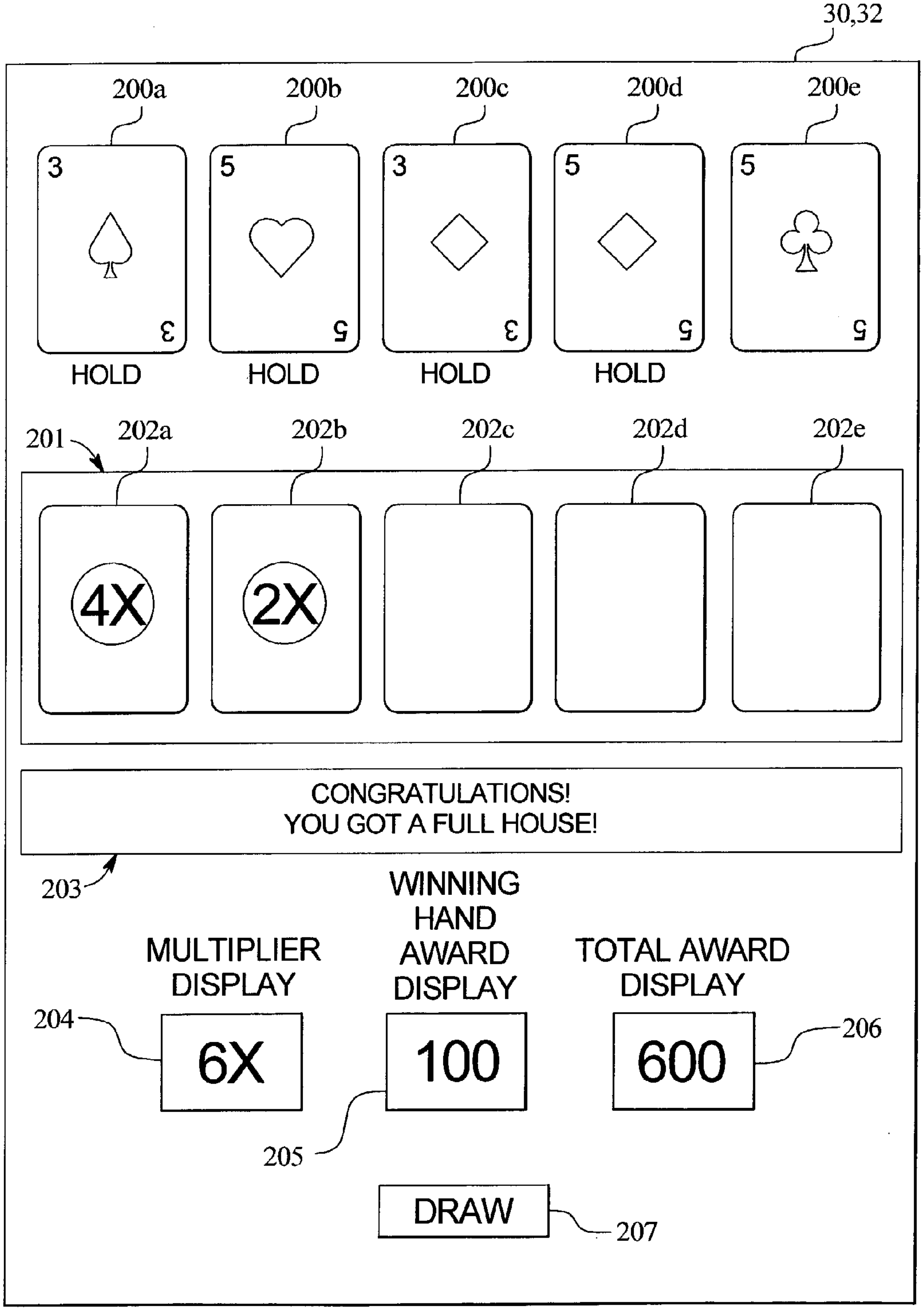

Referring now to FIGS. 5A to 5C, an example of another embodiment of the present invention is illustrated where the deck or set of fifty-two playing cards includes a plurality of multiplier cards. In this example, the gaming device includes a video draw poker game and displays five cards such as cards 200*a*, 200*b*, 200*c*, 200*d*, and 200*e* to a player in the initial or first draw of the cards. After the first draw of cards, the player's hand includes the cards 200*a*, 200*b*, 200*c*, 200*d* and 200*e*, which indicate a three of spades, five of hearts, a multiplier card including a multiplier of 4×, a five of diamonds, and another multiplier card including a multiplier of 2×, respectively. The gaming device transfers the two multiplier cards, cards 200*c* and 200*e*, to the multiplier card locations 202*a* and 202*b* in multiplier card display 201. In one embodiment, the multipliers associated with the multiplier cards are summed together and indicated in the multiplier display 204. Therefore, in this example, the multipliers of 4× and 2× associated with the multiplier cards 200*c* and 200*e* are summed together to provide a total multiplier of 6× as indicated by the multiplier display 204. In another embodiment, the multipliers associated with the multiplier cards indicated in a hand are multiplied together to provide the total multiplier. For example, the total multiplier according to this embodiment would be 8×. The instruction display 203 indicates instructions to the player at various points in the game. The winning hand award display 205 indicates a value of zero because the player has not obtained a winning hand in the game. Similarly, the total award display indicates a total award of zero as indicated by the total award display 206.

Referring now to FIG. 5B, the gaming device provides a non-multiplier card to replace each of the multiplier cards 200*c* and 200*e* indicated in the hand. The multiplier card 200*c* is replaced with a non-multiplier card including the three of diamonds. The multiplier card 200*e* is replaced with a non-multiplier card including the Ace of spades. The gaming device now determines if a winning card combination is indicated by the non-multiplier cards 200*a*, 200*b*, 200*c*, 200*d* and 200*e*. The non-multiplier cards include two pairs or two cards including a three and two cards including a five. The pair of three's (cards 200*a* and 200*c*) and pair of five's (cards 200*b* and 200*d*) form a winning card combination or winning hand in the game. Thus, the gaming device provides an award of ten which is the award associated with the winning card combination including two pairs of cards as illustrated in the award table shown in FIG. 3B. The award of ten is multiplied by the total accumulated multiplier of 6× as indicated by the multiplier display 204. The total award remains at zero as indicated by the total award display 206 because there is one draw remaining in the game.

Once the multiplier cards 200*c* and 200*e* are replaced with non-multiplier cards, the instruction display 203 instructs the player to "Touch the cards that you want to hold. Press 'Draw' when Finished." The gaming device enables the player to pick one or more of the cards in the hand to hold or keep in the player's hand. In this example, the player picks the cards the player wishes to hold or keep in their hand by touching or pressing the actual card on the display. As shown in FIG. 5B, the player opts to touch and thereby hold cards 200*a*, 200*b*, 200*c* and 200*d*. This guarantees that the player will get a winning card hand that at least includes two pairs of cards. The gaming device will therefore replace the non-held card, card 200*e*, with a randomly selected card from the deck or set of fifty-two playing cards. The player presses the draw button 207 as shown when the player is finished picking the cards to hold or keep in the hand to initiate another draw of the cards.

Referring to FIG. 5C, the gaming device replaces the non-held card 200*e* with a new card, which is the five of clubs. The addition of the five of clubs to the player's hand provides the player with a winning hand that includes a full house (i.e., three cards including the number three and two cards including the number five). The gaming device also indicates to the player that the player obtained a full house in the game using the instruction display 203. An award of one hundred, which is associated with a winning hand including a full house as indicated by the award table shown in FIG. 3B, is provided to the player as indicated by the winning hand award display 205. Thus, the winning hand award of one hundred is multiplied by the total accumulated multiplier of 6×, as indicated in the multiplier display 204, and provided to the player. The multiplied award of six hundred is provided to the player as indicated in the total award display 206. Because the game only includes two draws of the playing cards, the game ends after the second draw and the player receives the total award of six hundred for that game.

Figure 6A:
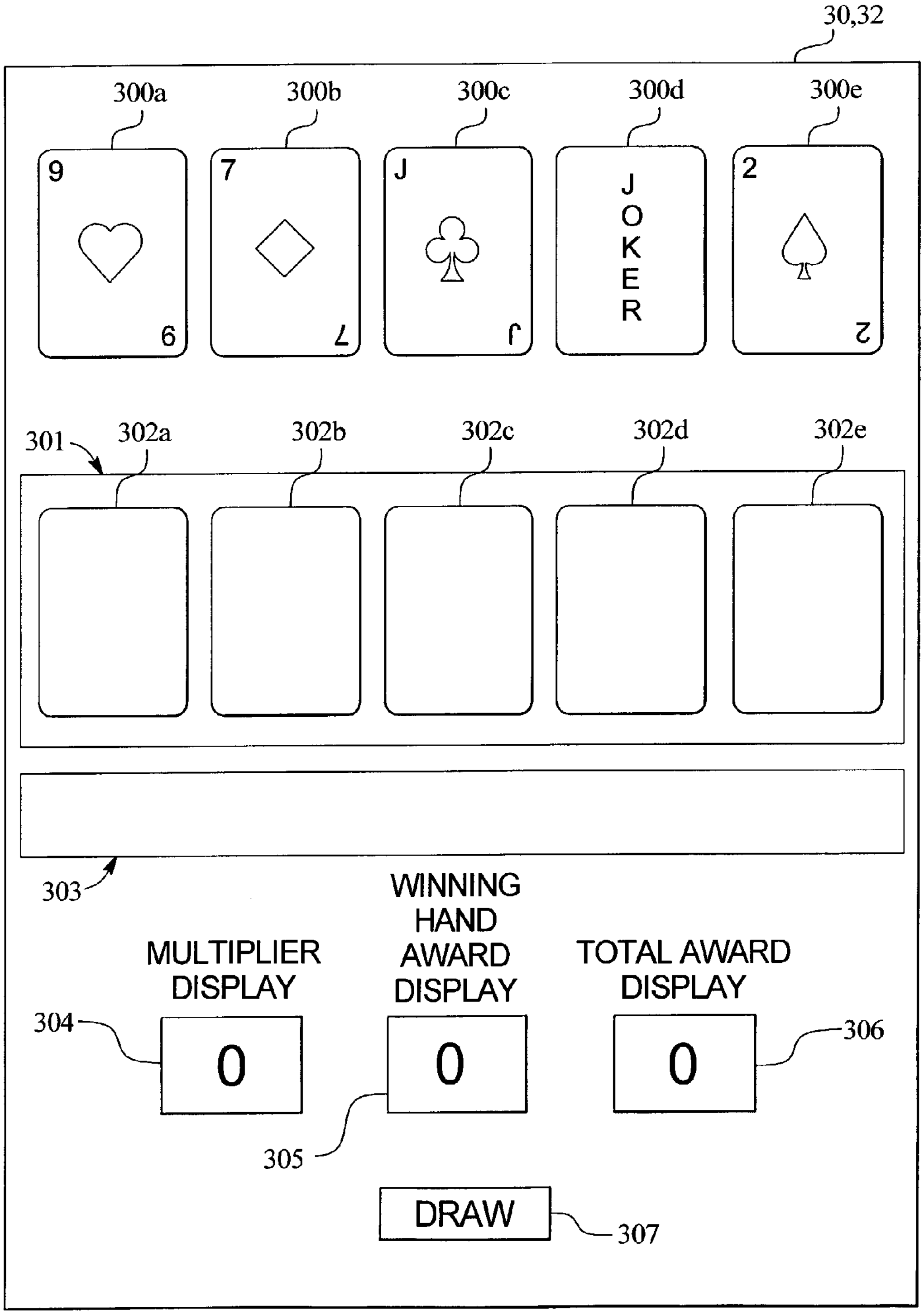
FIG. 6A is an enlarged elevation view of a further embodiment of the gaming device of the present invention where a specific card in a deck of cards is designated as a multiplier card.

Referring to FIGS. 6A to 6E, an example of another embodiment of the present invention is illustrated where the multiplier cards are represented by a specific card in the deck of fifty-two cards such as the joker card. It should be appreciated that one or a plurality of the cards in the deck may be designated as multiplier cards. In this example, the joker cards do not initially include multipliers. Instead, if a joker card or cards are displayed in the initial draw of cards to the player (i.e., the player's hand), the gaming device randomly assigns a multiplier to each joker card. The multiplier assigned to the joker card is randomly selected from a plurality of multipliers (column 306) as indicated in the multiplier table shown in FIG. 6B. As shown in FIG. 6B, a probability of being selected by the gaming device or processor is associated with each of the multipliers (column 308) such that the multipliers are assigned to the joker card or cards based on the probabilities. In one embodiment, the probability associated with a relatively small multiplier such as 2× is greater than the probability associated with a relatively large multiplier such as 8×. In another embodiment, all of the probabilities associated with the multipliers are the same. In a further embodiment, at least one of the multipliers is different. In another embodiment, a plurality of the multipliers are different. It should be appreciated that any suitable probability may be associated with the multipliers. It should also be appreciated that any suitable multipliers may be employed in a game.

Referring to FIG. 6A, the gaming device displays an initial or first draw of cards to form the player's hand in the game. In this example, the initial draw of cards 300*a*, 300*b*, 300*c*, 300*d* and 300*e* indicate cards including the nine of clubs, the seven of diamonds, the Jack of clubs, a Joker card and the two of spades, respectively. The multiplier card display 301 includes five multiplier card positions or locations 302*a*, 302*b*, 302*c*, 302*d* and 302*e*. The multiplier or multipliers associated with one or more Joker cards indicated in a hand are transferred and displayed in the multiplier card display when a multiplier is associated with the Joker card or cards. Furthermore, an instruction display 303 indicates instructions or statements to a player during the course of the game to prompt the player to perform some action in the game or to indicate a winning hand in the game. A multiplier display 304 indicates the total accumulated multiplier obtained by the player in the game. The winning hand award display 305 indicates the award associated with any winning hands obtained by the player in the game. The total award display 306 indicates the total award accumulated by the player in the game. The draw button or input 307 enables the player to communicate with the processor of the gaming device to provide an additional draw or draws of cards up to the draw limit in the game.

Referring to FIG. 6B, a multiplier table is illustrated where column 306 indicates the multipliers associated with the game and column 308 indicates the probability of each multiplier being selected by the processor in the game. For example, the probability that the multiplier of 2× will be selected by the processor and associated with a joker card in the game is 40%. Comparatively, the probability that the processor will select a multiplier of 8× to associate with a joker card in the game is only 1%. Thus it is more likely in this example that a multiplier of 2× will be associated with a joker card than a multiplier of 8×.

Figure 6C:
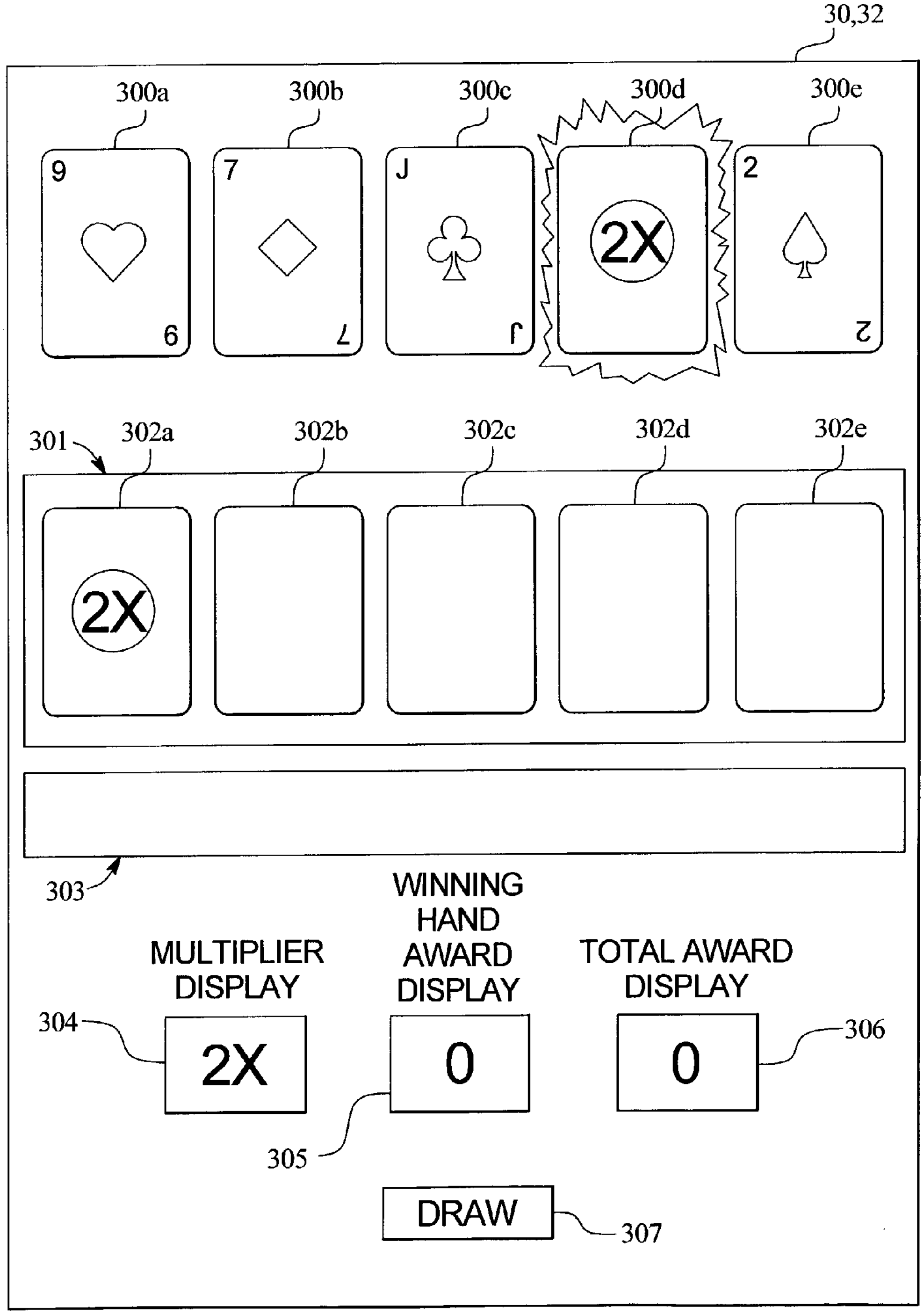
FIGS. 6C to 6E are enlarged elevation views of an example of the embodiment of FIG. 6A.

Referring to FIG. 6C, the gaming device selects the multiplier of 2× and associates that multiplier with the displayed joker card 300*d*. The multiplier of 2× is then transferred to the multiplier card display 301 and placed in the multiplier card location 302*a*. Also, the multiplier is indicated in the multiplier display 304. The player has not obtained a winning hand award or a total award in the game as indicated by the winning hand award display 305 and the total award display 306, respectively.

Figure 6D:
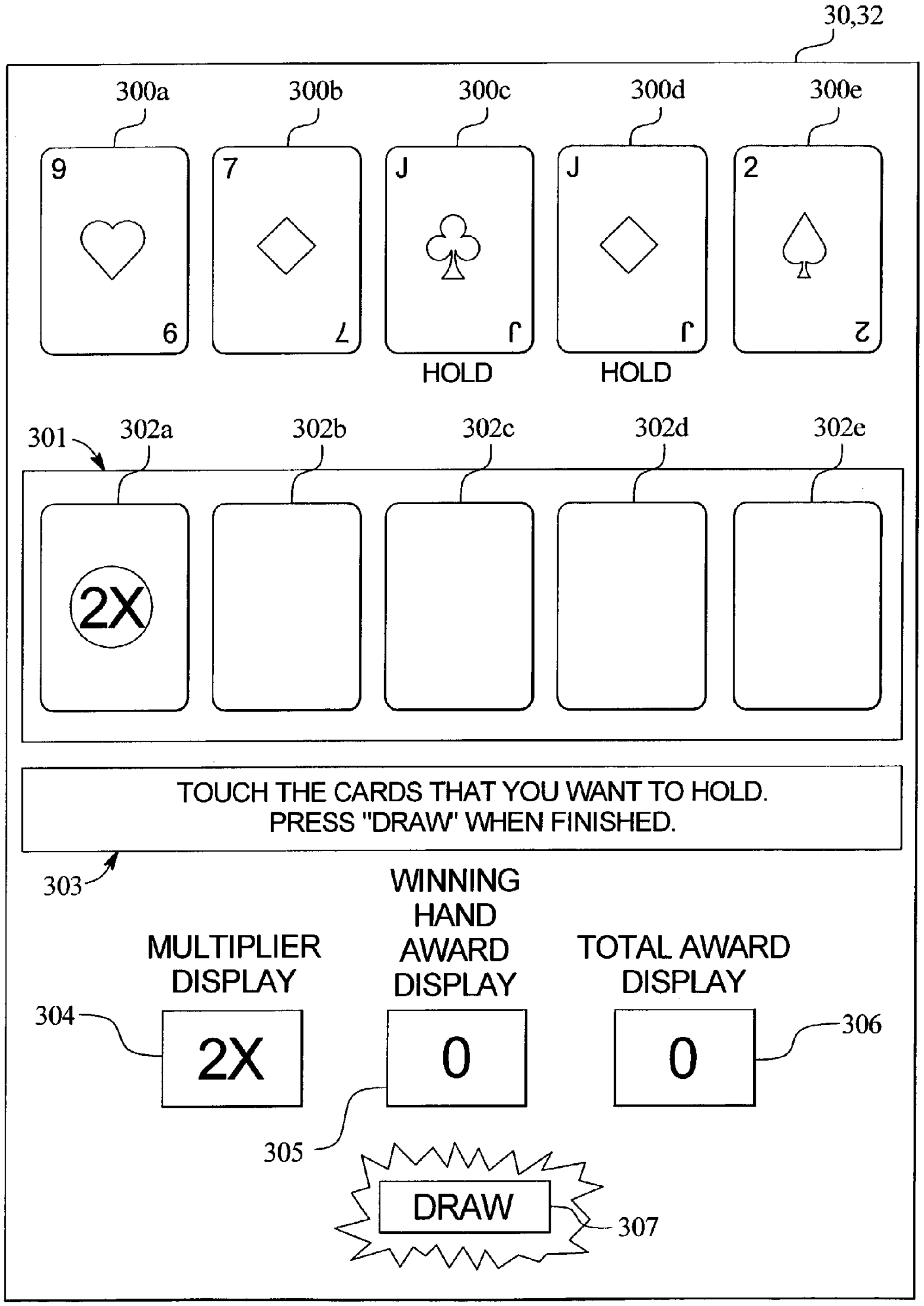

Referring to FIG. 6D, the gaming device prompts or instructs the player to touch the cards that the player wants to hold or keep in the player's hand and to press the draw input or draw button when finished as indicated by the instruction display 303. In this example, the player touches or presses cards 300*c* and 300*d* to hold or to keep those cards in the player's hand. The held cards are indicated by the word "hold" displayed below the card when the player picks that respective card. Thus, the player does not wish to hold cards 300*a*, 300*b* and 300*e* and therefore indicates to the processor that the player wants to replace these cards with randomly selected cards from the remaining cards in the deck or set of fifty-two cards. When the player is finished selecting cards to hold or keep in the player's hand, the player presses the draw button 307 as indicated in FIG. 6D to initiate another draw of the cards from the deck.

Figure 6E:
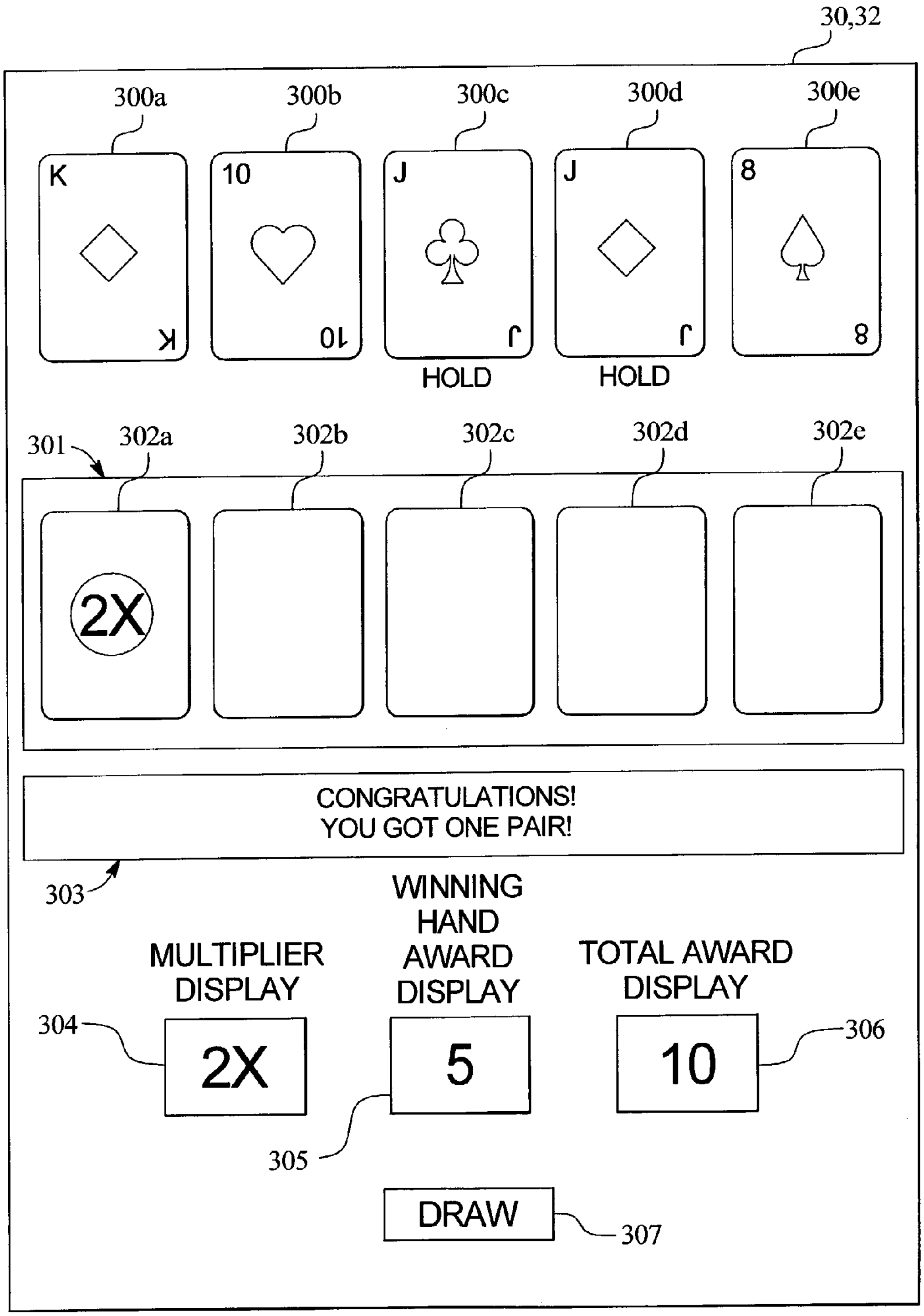

Referring to FIG. 6E, the gaming device replaces the non-held cards 300*a*, 300*b* and 300*e* with cards including the King of diamonds, the ten of hearts, and the eight of spades, respectively. This provides the player with a winning card combination including a pair of Jacks. Thus, the player did not improve their hand in the second draw. The gaming device indicates to the player that they have obtained a pair of cards which is a winning combination or winning hand in the game as indicated by the instruction display 303. The award associated with a winning hand including a pair of cards that are Jacks or better is an award of five which is indicated in the winning hand award display 305. The winning hand award indicating by the winning hand award display 305 is multiplied by the total accumulated multiplier indicated in the multiplier display 304, which is 2×, to provide the player with a total award of ten as indicated by the total award display 306. Because the game only includes two draws of the playing cards, the game ends and the player receives the total award of ten for the game.

Figure 7A:
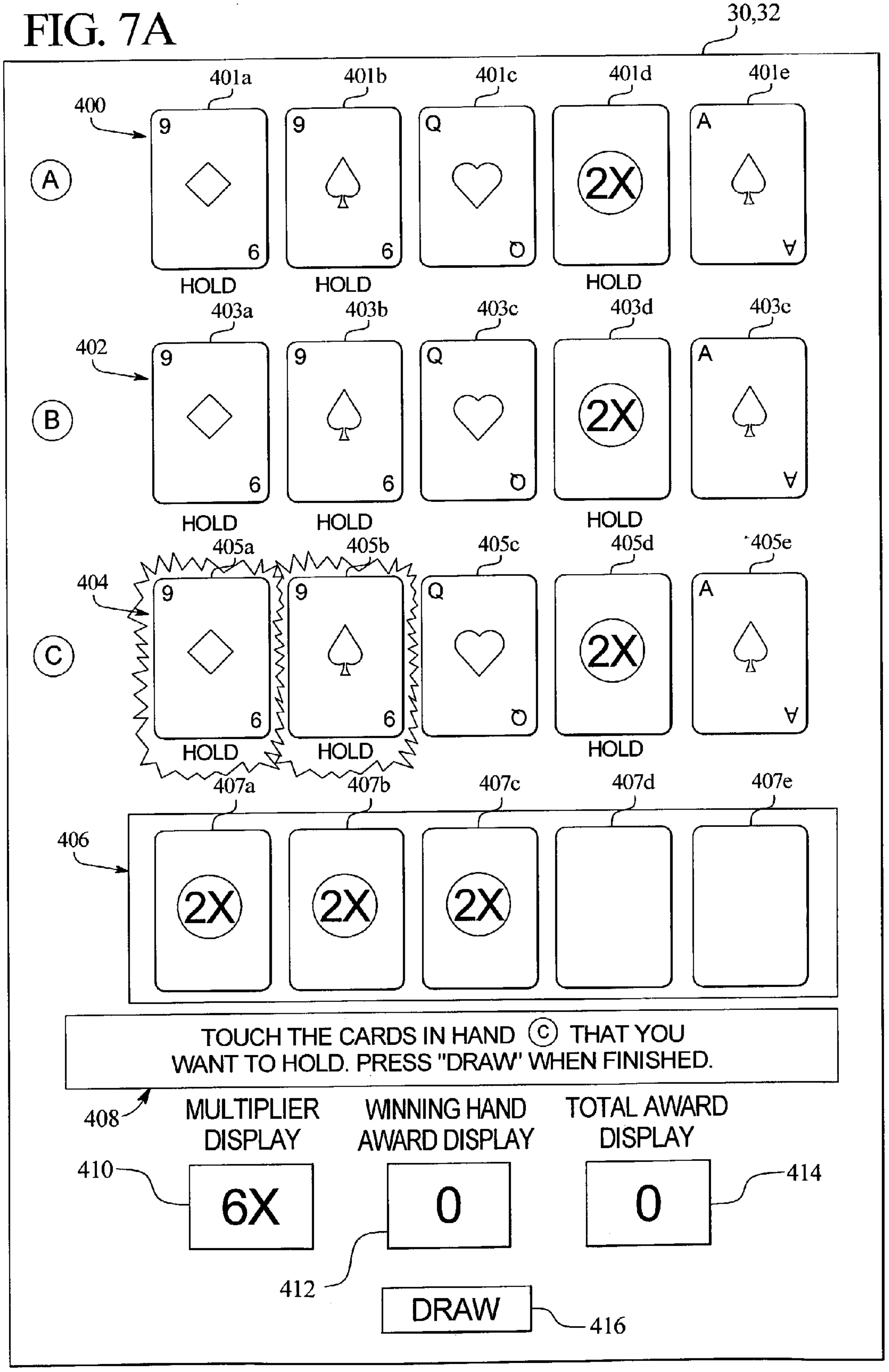
FIGS. 7A to 7C are enlarged elevation views of an example of another embodiment of the gaming device of the present invention illustrating a multi-hand video draw poker game.
Figure 7B:
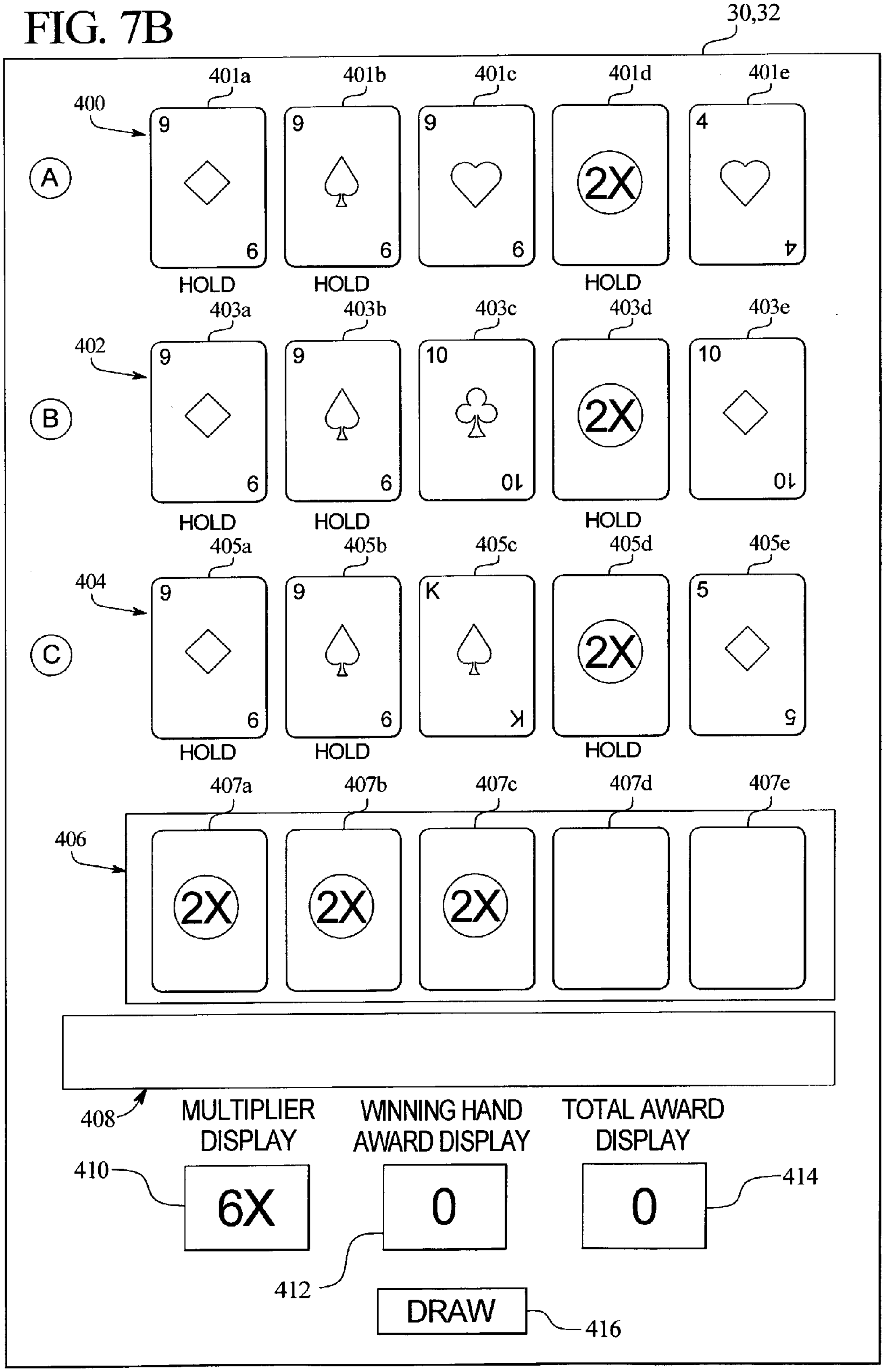
Figure 7C:
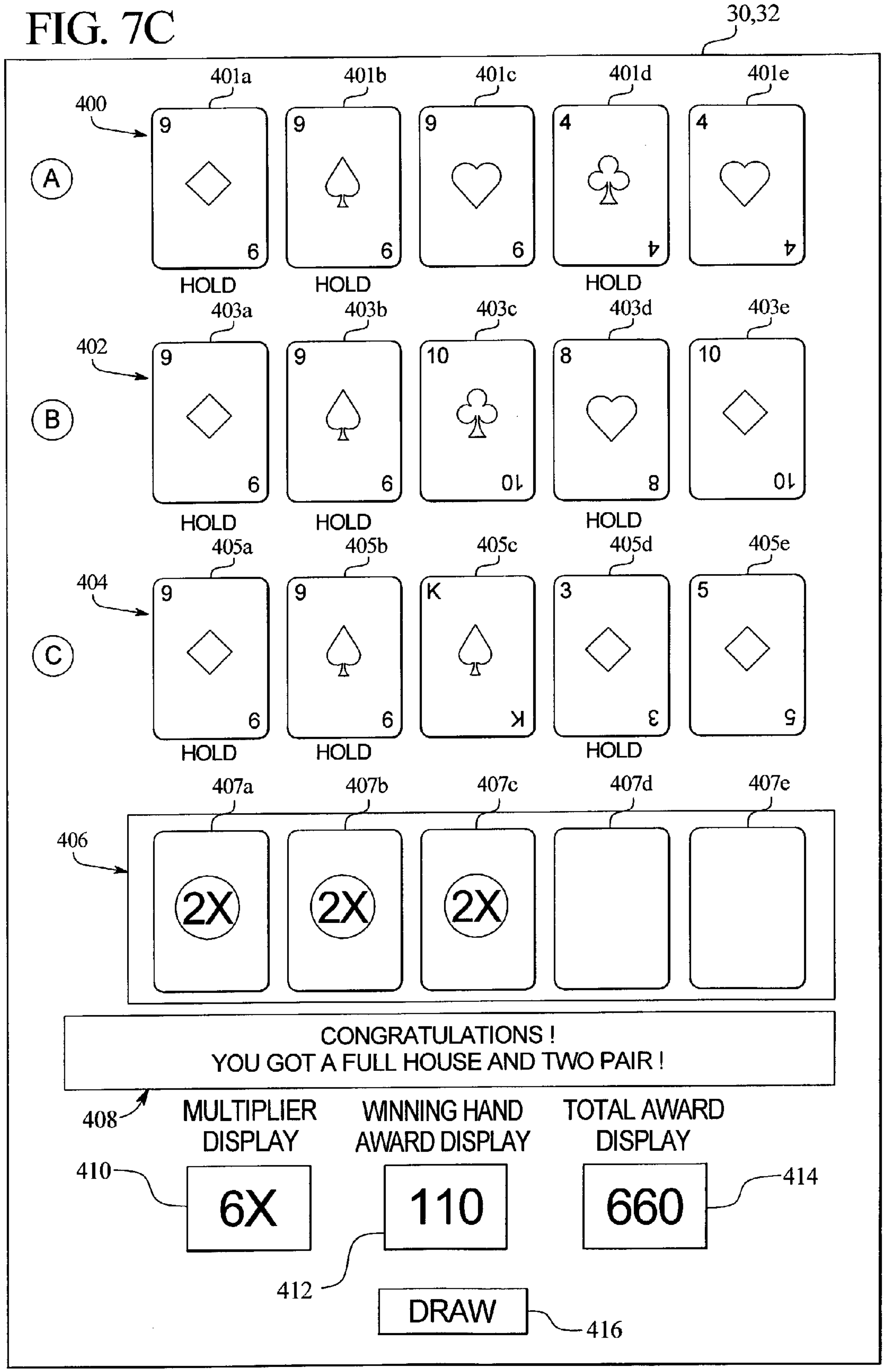

Referring to FIGS. 7A to 7C, an example of a further embodiment of the present invention is illustrated where the draw poker game includes multiple hands displayed to a player in a game. In FIG. 7A, the gaming device displays three hands 400 (Hand A), 402 (Hand B) and 404 (Hand C) to a player in the game. In this embodiment, the gaming device provides an initial or first draw of cards to form each of the hands in the game. Specifically, in this embodiment, the gaming device provides an initial or first draw of cards to form the first hand 400 in the game. The second and third hands 402 and 404, respectively are formed with the same cards indicated in the first hand 400. It should be appreciated that the cards that form the hands in a game may be the same cards or different cards. Thus, the gaming device randomly selects cards from a conventional deck or set of fifty-two cards to form the player's hand 400.

As illustrated in FIG. 7A, cards 401*a*, 401*b*, 401*c*, 401*d* and 401*e* include the nine of diamonds, the nine of spades, the Queen of hearts, a multiplier card including a multiplier of 2× and the Ace of spades, respectively. The gaming device then indicates the same cards in the player's hand 402 and 404 as shown in FIG. 7A. Thus, cards 403*a*, 403*b*, 403*c*, 403*d* and 403*e* include the nine of diamonds, the nine of spades, the Queen of hearts, a multiplier card including a multiplier of 2× and the Ace of spades, respectively. Similarly, cards 405*a*, 405*b*, 405*c*, 405*d* and 405*e* include the nine of diamonds, the nine of spades, the Queen of hearts, a multiplier card including a multiplier of 2× and the Ace of spades, respectively. The gaming device then prompts or instructs the player using the instruction display 408 to touch the cards in hand C or 404 that the player wants to hold or keep in that hand. Then the gaming device instructs the player to press the draw button when finished to continue as indicated in the instruction display 408. In this embodiment, any cards that are held in hand 404 or hand C, will also be held in hand 400 or hand A, and hand 402 or hand B. This enables the player to have three opportunities to obtain or improve a particular hand in the game. In this example, the player presses cards 401*a*, 401*b* and 401*d* to indicate that the player wants to hold or keep those cards in hands 400, 402 and 404. It should be noted that in this embodiment, the player has the option of holding or keeping the multiplier card 401*d*. Thus, a player may opt to not hold the multiplier card to obtain a better non-multiplier card or a better multiplier card in the game. In another embodiment, the gaming device automatically holds or keeps any multiplier cards indicated in one or more of the hands. Additionally, in this example, the gaming device sums the multipliers associated with the multiplier card or cards indicated in the hands in the game. In another embodiment, the gaming device multiplies the multipliers indicated in the hands. In a further embodiment, the gaming device only provides the multiplier (i.e., 2×) associated with one of the hands in the game such as the first hand.

In this example, the gaming device sums the multipliers indicated in each of the player's hands in the game. The player held card 401*d* which includes the multiplier card having a multiplier of 2×, and therefore the gaming device sums the multiplier indicated on the multiplier cards in each of the hands, which is 6×. The multipliers associated with the multiplier cards are transferred to the multiplier card display 406 and placed in multiplier card locations 407*a*, 407*b* and 407*c*. Furthermore, the total accumulated multiplier of 6× is indicated in the multiplier display 410. When the player finishes pressing the cards the player wants to hold, the player presses the draw button 416 to continue.

Referring to FIG. 7B, the gaming device provides a second draw of playing cards to replace the non-held cards in the hands in the game. The non-held cards in each of the hands are replaced with randomly selected cards from the remaining cards in the deck of fifty-two cards. Furthermore, the cards replaced in each of the hands are replaced with different cards, which enables the player to have three opportunities to obtain a winning hand in the game. In hand A or hand 400, the non-held cards 401*c* and 401*e* are replaced with the nine of hearts and the four of hearts, respectively. This hand now includes a winning hand of three of a kind (i.e., three cards including the number nine). The non-held cards 403*c* and 403*e* in hand B or hand 402 are replaced with the ten of clubs and the ten of diamonds, respectively. This combination of cards now indicates two pairs, which is also a winning hand in the game. The two pairs include a pair of nines and a pair of tens. The non-held cards 405*c* and 405*e* in hand C or hand 404 are replaced with the King of spades and the five of diamonds, respectively. This hand does not indicate a winning hand because a pair of nines is not equal to or greater in value than a pair of Jacks as indicated by the winning hand table of FIG. 3B. Thus, the player obtained two winning hands in the game. In one embodiment, the gaming device sums the awards associated with each of the winning hands and provides the total accumulated winning hand award to the player in the winning hand award display 412. In another embodiment, the gaming device provides the player with the greatest or largest award associated with any of the winning hands indicated in the player's hands. In this example, the gaming device sums all of the awards associated with any winning hands indicated in the game.

Referring to FIG. 7C, the gaming device indicates to the player that the player received a full house and two pair as indicated by the instruction display 408. The gaming device now provides the player with the awards associated with a full house, which is one hundred, and the award associated with two pair, which is ten. The total accumulated winning hand award of one hundred ten is indicated by the winning hand award display 412. The winning hand award of one hundred ten is now multiplied by the total multiplier of 6× indicated by the multiplier display 410 to provide the player with a total award of six hundred sixty as indicated in the total award display 414. In this example, the gaming device only provides two draws of the playing cards in the game and therefore the game ends. The player receives the total award indicated by the total award display which is six hundred sixty.

In a further embodiment of the present invention, the gaming device provides a method of playing a poker game. In one embodiment, the method includes the steps of playing a draw poker game and displays an initial or first draw of cards to form a player's hand in the game. The first initial draw of cards are selected and dealt from a conventional deck or set of fifty-two playing cards which includes at least one multiplier card. The multiplier associated with the multiplier card may be any suitable multiplier as desired by the game implementor. The gaming device replaces any multiplier cards indicated in the initial draw of cards with a non-multiplier card. The player then picks or selects one or more of the cards to hold or keep in the player's hand. The non-held cards are replaced with randomly selected cards from the deck or set of fifty-two cards in an additional or second draw of the cards dealt to the player. After the second draw, the player's hand is evaluated to determine if the player has obtained a winning combination of cards or winning hand in the game. If the player has obtained a winning hand, such as a full house, a winning hand award associated with the winning hand is provided to the player. The award may be credits, coins, or any other suitable award.

In another embodiment of the method of the present invention, the deck or set of fifty-two cards includes a plurality of multiplier cards. In this embodiment, a first draw of the cards forms the player's hand in the game. In one embodiment, any multipliers associated with multiplier cards indicated in the first draw of cards are summed together to provide a total accumulated multiplier to the player. In another embodiment, the multipliers associated with the multiplier cards indicated in the initial or first draw are multiplied together to provide the total multiplier to the player. The multiplier cards are then replaced with non-multiplier cards in the player's hand. The non-multiplier cards are selected from the deck or set of fifty-two playing cards. Therefore, the second draw of cards from the deck of fifty-two cards randomly replaces the multiplier cards indicated in the player's hand. After the second draw of cards, the player's hand is evaluated to determine if a winning combination of cards or winning hand is indicated by the cards in the player's hand. The award associated with any winning combination of cards is provided to the player when the cards indicate a predetermined winning hand in the game. The award associated with any winning hands in the game is multiplied by the total accumulated multiplier in the game to provide the total award for the game to the player. After the second draw, the game ends and the player receives the total award for the game.

In a further embodiment of the method of the present invention, the multiplier cards are represented by a specific card in the deck of fifty-two cards such as a joker card. In another embodiment the multiplier cards are represented by a plurality of cards in the deck of fifty-two cards. After a draw of the cards, any joker cards indicated in the player's hand are associated with a multiplier, which is selected from a group of multipliers. The multipliers may be any suitable multipliers and are each associated with a probability of being selected and associated with the joker cards. If more than one multiplier card is indicated in the game, the multipliers associated with the multiplier cards are summed together to provide a total multiplier to player in the game as described above. Alternatively, the multipliers may be multiplied together to provide the total multiplier to the player in the game. The multiplier cards (i.e., the joker cards) are randomly replaced with non-multiplier cards in a second draw of cards from the deck of fifty-two cards. The player then picks or selects cards in the player's hand to hold or keep in the hand. A second draw of cards replaces the non-held cards in the player's hand. The player's hand is then evaluated to determine if a winning combination of cards or a winning hand is indicated by the cards. An award such as credits or coins associated with any winning hands is provided to the player in the game. The winning hand award is multiplied by the accumulated multiplier or multipliers in the game to provide a total award to the player in the game.

In another embodiment of the method of the present invention, the player is dealt two or more hands in a poker game. The initial or first draw of cards forms each of the hands in the multi-hand poker game. Any multiplier cards indicated in the hands are replaced with non-multiplier cards randomly selected from the deck of fifty-two cards. In one embodiment, the multipliers associated with the multiplier cards are summed together to provide a total multiplier to the player in the game. In another embodiment, the multipliers are multiplied together to provide the total multiplier to the player. In a further embodiment, only one of the multipliers associated with the multiplier card in one of the hands is provided to the player in the game. After the multiplier cards are replaced with non-multiplier cards, the player picks or selects cards to hold or keep in each of the hands. A second draw of cards then replaces the non-held cards in each of the hands to provide the player with multiple opportunities to obtain a winning hand in a game. Each of the hands are evaluated to determine if any of the hands includes a winning hand in the game. In one embodiment the awards associated with each winning hand in the game are summed together to provide the player with a total winning hand award in the game. The total winning hand award is multiplied by the total multiplier in the game to provide a total award to the player in the game. In another embodiment, only the largest award associated with any winning hands in the game is provided to the player. Thus, this winning hand award is multiplied by the total multiplier to provide the total award in the game.

In an alternative embodiment, the deck does not include a multiplier card or a modifier. Instead, the multiplier is provided separately from the cards dealt to the player in a game. In this embodiment, the multiplier is randomly selected from a plurality of different multipliers. The multiplier may be displayed to the player on the same display device as the player's hand, on a separate display device or on any suitable display viewable by the player. In this embodiment, the occurrence of the multiplier is randomly determined to apply to the player's hand or not to apply to the player's hand. Therefore, a multiplier may or may not be provided to the player in a game in a similar manner as if it was dealt to the player from the deck of cards. However, this embodiment further enables the game implementor to employ the exact probability for setting the odds the multiplier will occur. If a multiplier is provided to the player, any award associated with a winning combination of cards or winning outcome is multiplied by the multiplier.

In one embodiment, the multiplier is only provided one time in a game. For example, if a multiplier is selected and displayed when the first set of cards or the first draw is dealt to the player, another multiplier will not be provided in the game. In another embodiment, the multiplier can be provided a plurality of times in a game. In this embodiment, the multiplier may be provided in one draw, a plurality of draws or provided independently for a game.

In another embodiment, the gaming device displays two or more hands to a player in a game as described above and a multiplier is randomly selected and provided to the player for each of the hands in the game. In this embodiment, the multiplier provided for each hand is different. It should be appreciated that at least one of the multipliers provided for the hands may be different, a plurality of the multipliers provided for the hands may be different or all of the multipliers provided for the hands may be different. The multipliers provided for each of the hands are multiplied by any awards associated with winning card combinations in the hands and then provided to the player. In another embodiment, a plurality of multipliers are provided to the player for each hand. In this embodiment, the multipliers in each hand are summed, multiplied or combined in any suitable manner to provide a total multiplier for each hand. Any awards associated with the hands are multiplied by the total multipliers for the hands and then provided to the player.

In a further embodiment, the occurrence of a multiplier being provided to the player in a game is associated with a probability. In one aspect of this embodiment, the probability of providing a multiplier increases after each draw of the cards. In another aspect, the probability increases after a plurality of draws. It should be appreciated that the probability may increase, decrease or remain unchanged in one, a plurality or all of the draws in the game.

In another embodiment, a probability of being selected and displayed to a player is associated with each of the multipliers in a group of different multipliers associated with a game. In this embodiment, the multipliers are randomly selected and displayed in a game based on the probabilities. It should be appreciated that any suitable probability may be associated with one or more of the multipliers in a game.

In one embodiment, when a multiplier is provided to the player, the multiplier is displayed when the cards are dealt to the player to enable the player to know the multiplier that will apply to that hand if the player wins. In another embodiment, the multiplier is not provided and displayed to the player until after the first draw. In a further embodiment, the multiplier is not provided and displayed to the player until after a plurality of draws. It should be appreciated that the multiplier may be provided to the player at any time in a game or not at all.

It should be appreciated that the present invention is described as employing one or more conventional decks including fifty-two playing cards. It should be appreciated that the present invention may employ any suitable cards including any suitable number of cards.

It should also be appreciated that the method of the embodiments described above may be employed in a stud poker game, a draw poker game or any suitable type of poker game. It should be further appreciated that the present invention may be employed in a primary game or a secondary game of a wagering game device.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

a virtual deck of cards including fifty-two playing cards and at least one modifier card;

a plurality of winning card combinations, each of said card combinations including at least two of the playing cards;

a modifier card display operable to display the at least one modifier card; and a processor programmed to randomly deal a number of the cards to a player to form the player's hand, replace any modifier card with one of the cards from the deck of cards when said modifier card is dealt to the player, cause the modifier card display to display any replaced modifier card, determine a winning hand award associated with any winning card combinations included in the hand, modify the winning hand award by a total modifier value associated with any replaced modifier card displayed by the modifier card display, determine a total award by multiplying the winning hand award by said total modifier value and provide the total award to the player.

2. The gaming device of claim 1, wherein the deck of cards includes a plurality of modifier cards.

3. The gaming device of claim 2, wherein the modifier cards include a plurality of multiplier cards.

4. The gaming device of claim 3, wherein the plurality of multiplier cards include different multiplier values.

5. The gaming device of claim 3, wherein the total modifier value is at least partially based on multiplier values associated with the multiplier cards and the multiplier values are summed when at least two of the multiplier cards are dealt to the player.

6. The gaming device of claim 3, wherein the total modifier value is at least partially based on multiplier values associated with the multiplier cards and the multiplier values are multiplied when at least two of the multiplier cards are dealt to the player.

7. The gaming device of claim 1, wherein the cards include at least one joker card.

8. The gaming device of claim 7, wherein a plurality of multiplier values are associated with the joker card.

9. The gaming device of claim 8, which includes a probability of being selected associated with each of the multiplier values, wherein the multiplier values are associated with the joker card based on the probabilities.

10. The gaming device of claim 1, wherein the number of cards dealt to the player is randomly determined.

11. The gaming device of claim 1, wherein the number of cards dealt to the player is pre-determined.

12. The gaming device of claim 1, which includes a plurality of draws of the cards provided to the player.

13. The gaming device of claim 12, which includes a selector for enabling a player to pick cards in the hand to keep in the hand after each draw of the cards.

14. The gaming device of claim 12, wherein at least one modifier card is included in one of the draws of the cards.

15. The gaming device of claim 12, wherein at least one modifier card is included in a plurality of the draws of the cards.

16. The gaming device of claim 12, wherein at least one modifier card is included in all of the draws of the cards.

17. The gaming device of claim 1, wherein the modifier card is only replaced with one of the playing cards from the deck of cards.

18. A gaming device comprising:

a virtual deck of cards including fifty-two playing cards and at least one multiplier card;

a plurality of winning card combinations, each of said card combinations including at least two of the playing cards;

a multiplier card display operable to display the at least one multiplier card; and a processor programmed to randomly deal a first draw of the cards to a player to form the player's hand, replace any multiplier card with one of the cards from the deck of cards when said multiplier card is dealt in the first draw of the cards, cause the multiplier card display to display any replaced multiplier cards, enable the player to independently select and keep at least one of the cards in the player's hand, randomly replace the non-selected cards in the player's hand with cards in a second draw of the cards, determine a winning hand award based on any winning card combinations included in the hand, and determine a total award by multiplying the winning hand award by a total multiplier value associated with any replaced multiplier card displayed by the multiplier card display and provide the total award to the player.

19. The gaming device of claim 18, wherein the deck of cards includes a plurality of multiplier cards.

20. The gaming device of claim 18, which includes a selector for enabling a player to pick cards in the hand to keep in the hand after each draw of the cards.

21. The gaming device of claim 18, wherein at least one multiplier card is included in one of the draws of the cards.

22. The gaming device of claim 18, wherein at least one multiplier card is included in a plurality of the draws of the cards.

23. The gaming device of claim 18, wherein at least one multiplier card is included in each of the draws of the cards.

24. A gaming device comprising:

a deck of cards including fifty-two playing cards and at least one multiplier card;

a plurality of card hands including the cards, each of said hands including a designated number of the cards;

a plurality of winning card combinations, each of said card combinations including at least two of the playing cards;

a multiplier card display operable to display the at least one multiplier card; and a processor programmed to deal cards from the deck of cards to form each of the hands, randomly replace any multiplier cards with one of the cards from the deck of cards in each of the hands when any multiplier cards are included in the hands, cause the multiplier card display to display any replaced multiplier cards, determine a winning hand award for any winning card combinations in the hands, determine a total award by multiplying the winning hand award by a total multiplier value associated with any replaced multiplier cards displayed by the multiplier card display and provide the total award to a player.

25. The gaming device of claim 24, wherein the total multiplier value includes the sum of any multiplier values associated with the multiplier cards in the hands.

26. The gaming device of claim 24, wherein the total multiplier value includes the multiplication of any multiplier values associated with the multiplier cards in the hands.

27. The gaming device of claim 24, wherein the designated number of cards in each of the hands is randomly determined.

28. The gaming device of claim 24, wherein the designated number of cards in each of the hands is pre-determined.

29. A gaming device comprising:

a virtual deck of cards including fifty-two playing cards and at least one multiplier card;

a plurality of card hands, each of said hands including a designated number of the cards;

a plurality of winning card combinations, each of said card combinations including at least two of the playing cards;

a multiplier card display operable to display the at least one multiplier card; and a processor programmed to deal a first draw of the cards to form each of the hands, enable a player to independently pick the cards to hold in the hands, replace any multiplier cards with cards selected from the deck of cards in each of the hands when one or more multiplier cards are included in the hands, cause the multiplier card display to display any replaced multiplier cards on the multiplier card display, determine a total multiplier value based on any multipliers associated with the replaced multiplier cards displayed by the multiplier card display, replace the non-held cards in the hands with playing cards dealt in a second draw of the cards, determine a winning hand award associated with winning card combinations indicated by the playing cards in the hands, determine a total award by multiplying the winning hand award by the total multiplier value and provide the total award to the player.

30. The gaming device of claim 29, which includes a selector to enable the player to pick cards in the hands after at least one of the draws of the cards.

31. The gaming device of claim 29, wherein the total multiplier value includes the sum of the multiplier values associated with any multiplier cards in the hands.

32. The gaming device of claim 29, wherein the total multiplier value includes the multiplication of the multiplier values associated with any multiplier cards in the hands.

33. The gaming device of claim 29, wherein the total multiplier value includes only one of the multiplier values associated with any multiplier cards included in the hands.

34. The gaming device of claim 29, wherein the first draw of cards includes randomly determined cards from the deck of cards.

35. The gaming device of claim 29, wherein the first draw of cards includes pre-determined cards from the deck of cards.

36. The gaming device of claim 29, wherein the winning hand award includes the sum of all of the winning hand awards associated with winning card combinations indicated by the hands.

37. The gaming device of claim 29, wherein the winning hand award includes only the largest winning hand award associated with any winning card combinations indicated by the hands.

38. A gaming device comprising:
- a virtual deck of cards including fifty-two playing cards and at least one multiplier card;
- a plurality of card hands, each of said hands including a designated number of the cards;
- a plurality of winning card combinations, each of said card combinations including at least two of the playing cards;
- a multiplier card display operable to display the at least on multiplier card; and
- a processor programmed to deal a first draw of the cards to form each of the hands, replace the multiplier cards with playing cards in each of the hands when the multiplier cards are included in the hands, cause the multiplier card display to display the replaced multiplier cards on the multiplier card display, determine a total multiplier value based on any multiplier values associated with the replaced multiplier cards displayed by the multiplier card display, enable a player to independently pick the cards to hold in the hands, replace the non-held cards in the hands with playing cards in a second draw of the cards, determine a winning hand award associated with any winning card combinations indicated by the playing cards in the hands, determine a total award by multiplying the winning hand award by the total multiplier value and provide the total award to the player.

39. The gaming device of claim 38, wherein each of the hands include the same cards after the first draw of the cards.

40. The gaming device of claim 39, wherein the processor enables the player to hold the cards in one of the hands and hold the same cards in at least one of the other hands.

41. The gaming device of claim 38, wherein the playing cards include playing cards from a plurality of fifty-two card decks of playing cards.

42. The gaming device of claim 38, which includes a selector to enable the player to pick the cards in the hands.

43. The gaming device of claim 38, wherein the total multiplier value includes the sum of the multiplier values associated with at least two of the multiplier cards in the hands.

44. The gaming device of claim 38, wherein the total multiplier value includes the multiplication of the multiplier values associated with at least two of the multiplier cards in the hands.

45. The gaming device of claim 38, wherein the total multiplier value includes only one of the multiplier values associated with any multiplier cards displayed in the hands.

46. The gaming device of claim 38, wherein the first draw of the cards includes randomly determined cards from the deck of cards.

47. The gaming device of claim 38, wherein the first draw of the cards includes pre-determined cards from the deck of cards.

48. The gaming device of claim 38, wherein the winning hand award includes the sum of all of the winning hand awards associated with any winning card combinations indicated by the hands.

49. The gaming device of claim 38, wherein the winning hand award includes only the largest winning hand award associated with any winning card combinations indicated by the hands.

50. A method of playing a poker game, said method comprising:
- (a) dealing a plurality of cards to a player randomly selected from a deck of cards including fifty-two playing cards and at least one modifier card;
- (b) replacing any modifier card with a playing card randomly selected from the deck of playing cards when said modifier card is dealt to the player;
- (c) displaying any replaced modifier cards on a modifier card display;
- (d) determining a winning hand award based on any winning card combinations indicated by the playing cards in the hand;
- (e) determining a total modifier value associated with any replaced modifier card displayed by the modifier card display;
- (f) determining a total award by multiplying the winning hand award by said total modifier value; and
- (g) providing the total award to the player.

51. The method of claim 50, wherein the number of cards are selected and dealt from a plurality of decks of fifty-two playing cards.

52. The method of claim 50, wherein the modifier card includes a multiplier card.

53. The method of claim 50, wherein the deck of cards includes a plurality of modifier cards.

54. The method of claim 53, wherein the plurality of modifier cards includes a plurality of multiplier cards.

55. The method of claim 54, which further includes forming the total modifier value by summing any multiplier values associated with at least two of the multiplier cards dealt to the player.

56. The method of claim 54, which further includes forming the total modifier value by multiplying any multiplier values associated with at least two of the multiplier cards dealt to the player.

57. The method of claim 54, wherein the multiplier cards include at least one joker card.

58. The method of claim 57, which includes associating a probability of being selected by the processor with each of a plurality of multiplier values, wherein at least one of the multiplier values is associated with the joker card based on the probabilities.

59. The method of claim 50, wherein replacing the modifier card with a playing card includes displaying a modifier value associated with the replaced modifier card on a modifier display.

60. The method of claim 50, wherein the steps of (a) to (g) are provided to the player through a data network.

61. The method of claim 60, wherein the data network is an internet.

62. A method of playing a poker game, said method comprising the steps of:
- (a) dealing a first draw of cards to a player to form the player's hand, wherein the cards are selected from a deck of cards including a plurality of playing cards and at least one multiplier card;
- (b) replacing any multiplier card with a playing card randomly selected from the deck of cards when any of said multiplier cards are dealt to the player in the first draw of cards;
- (c) displaying any replaced multiplier cards on a multiplier card display;
- (d) enabling the player to independently pick at least one of the cards in the player's hand to hold the picked cards in the player's hand;

(e) replacing each of the un-picked cards with a playing card randomly selected from the deck of cards in a second draw of cards;

(f) determining a winning hand based on any winning card combinations included in the hand;

(g) determine a total award by multiplying the winning hand award by a total multiplier value associated with the replaced multiplier cards displayed by the multiplier card display; and (h) providing the total award to the player.

63. The method of claim 62, wherein the total multiplier value includes the sum of each multiplier value associated with at least two multiplier cards dealt to the player.

64. The method of claim 62, wherein the total multiplier value includes the multiplication of each multiplier value associated with at least two multiplier cards dealt to the player.

65. The method of claim 62, wherein replacing each multiplier card with a playing card includes displaying a multiplier value associated with the replaced multiplier card on a multiplier display.

66. The method of claim 62, wherein only the first draw of cards includes cards selected from a deck of cards including at least one multiplier card.

67. The method of claim 62, wherein all of the draws of cards include cards selected from the deck of cards including at least one multiplier card.

68. The method of claim 62, wherein the steps of (a) to (h) are provided to the player through a data network.

69. The method of claim 68, wherein the data network is an internet.

70. A method of playing a poker game, said method comprising:

(a) dealing a plurality of card hands to a player, said hands being formed with cards randomly selected from a deck of cards including a plurality of playing cards and at least one multiplier card;

(b) replacing any multiplier cards with playing cards in each of the hands, wherein the playing cards are randomly selected from the deck of cards after one or more multiplier cards are dealt to the player;

(c) displaying any replaced multiplier cards on a multiplier card display;

(d) determining a winning hand award associated with any winning card combinations indicated by the hands;

(e) determining a total award by multiplying the winning hand award by a total multiplier value associated with the replaced multiplier cards displayed by the multiplier card display; and (f) providing the total award to the player.

71. The method of claim 70, wherein (a) to (f) are provided to the player through a data network.

72. The method of claim 71, wherein the data network is an internet.

73. A method of playing a poker game, said method comprising:

(a) dealing a first draw of cards to a player where the first draw of cards forms a plurality of card hands, said first draw of cards including a number of cards randomly selected from a deck of cards including fifty-two playing cards and at least one multiplier card;

(b) replacing the multiplier cards with playing cards in each of the hands after one or more multiplier cards are dealt to the player, wherein the playing cards are randomly selected from the deck of cards;

(c) displaying the replaced multiplier cards on a multiplier card display;

(d) enabling the player to independently select at least one of the cards in at least one of the hands to hold the selected card in that hand;

(e) replacing any non-selected cards with playing cards randomly selected from the deck of cards in a second draw of the cards;

(f) determining a winning hand award based on any winning card combinations indicated by the playing cards in the hands;

(g) determining a total award by multiplying the winning hand award by a multiplier value associated with each of the replaced multiplier cards displayed on the multiplier card display; and (h) providing the total award to the player.

74. The method of claim 73, wherein the card hands include the same cards after the first draw of the cards.

75. The method of claim 73, wherein enabling the player to select at least one of the cards in at least one of the hands to hold the selected card in that hand further includes holding the selected card in a plurality of the hands.

76. The method of claim 73, wherein enabling the player to select at least one of the cards in at least one of the hands to hold the selected card in that hand further includes holding the selected card in all of the hands.

77. The method of claim 73, wherein replacing any non-selected cards with randomly selected playing cards picked from the deck of cards includes replacing the non-selected cards in each of the hands with cards randomly selected from the deck of cards.

78. The method of claim 73, which includes repeating steps (d) to (e) for a designated number of draws.

79. The method of claim 73, which includes repeating steps (b) to (e) for a designated number of draws.

80. The method of claim 73, which includes summing the multiplier values associated with the multiplier cards in at least one of the hands.

81. The method of claim 73, which includes multiplying the multiplier values associated with the multiplier cards in at least one of the hands.

82. The method of claim 73, wherein (a) to (h) are provided to the player through a data network.

83. The method of claim 82, wherein the data network is an internet.

84. A method of operating a gaming device, said method comprising the steps of:

(a) dealing an initial number of cards to a player randomly selected by a processor from a deck of cards including fifty-two playing cards and a modifier card;

(b) replacing the modifier card with a playing card randomly selected by a processor from the deck of cards when the modifier card is dealt in the initial number of cards;

(c) displaying the replaced modifier card on a modifier card display;

(d) determining a winning hand award based on any winning card combinations indicated by the playing cards in the hand;

(e) determining a total award by multiplying the winning hand award by any modifier value associated with the replaced modifier card displayed by the modifier card display; and (f) providing the total award to the player.

85. The method of claim 84, wherein the initial number of cards are selected and dealt from a plurality of decks of cards.

86. The method of claim 84, wherein the modifier card includes a multiplier card.

87. The method of claim 84, wherein the deck of cards includes a plurality of modifier cards.

88. The method of claim 87, wherein the plurality of modifier cards includes a plurality of multiplier cards.

89. The method of claim 88, which further includes summing the modifier values associated with at least two of the multiplier cards dealt to the player.

90. The method of claim 88, which further includes multiplying the modifier values associated with at least two of the multiplier cards dealt to the player.

91. The method of claim 88, wherein the multiplier cards include at least one joker card.

92. The method of claim 91, which includes associating a probability of being selected by the processor with each of the modifier values, wherein the modifier value is associated with the joker card based on the probabilities.

93. The method of claim 81, wherein (a) to (f) are provided to the player through a data network.

94. The method of claim 93, wherein the data network is an internet.

95. A method of operating a gaming device, said method comprising:

(a) dealing a first draw of cards to a player to form the player's hand, wherein the cards are selected from a deck of cards including fifty-two playing cards and at least one multiplier card;

(b) replacing each multiplier card with a playing card randomly selected by a processor from the deck of cards when one or more multiplier cards are dealt to the player in the first draw of cards;

(c) displaying each replaced multiplier card on a multiplier card display;

(d) enabling the player to independently pick at least one of the cards in the player's hand to hold the picked cards in the player's hand;

(e) replacing each of the un-picked cards with a playing card randomly selected from the deck of cards in a second draw of cards;

(f) determining a winning hand award based on any winning card combinations indicated by the playing cards in the hand;

(g) determining a total award by multiplying the winning hand award by a total multiplier value associated with the replaced multiplier cards displayed by the multiplier card display; and (h) providing the total award to the player.

96. The method of claim 95, wherein the total multiplier value includes the sum of each multiplier value associated with at least two multiplier cards dealt to the player.

97. The method of claim 95, wherein the total multiplier value includes the multiplication of each multiplier value associated with at least two multiplier cards dealt to the player.

98. The method of claim 95, wherein (a) to (h) are provided to the player through a data network.

99. The method of claim 98, wherein the data network is an internet.

100. A method of operating a gaming device, said method comprising:

(a) dealing a plurality of card hands to a player, said hands being formed with a number of cards randomly selected by a processor from a deck of cards including fifty-two playing cards and at least one multiplier card;

(b) replacing any multiplier cards with playing cards in each of the hands, wherein the playing cards are randomly selected by the processor from the deck of cards after one or more multiplier cards are dealt to the player;

(c) displaying any replaced modifier cards on a multiplier card display;

(d) determining a winning hand award based on any winning card combinations indicated by the playing cards in at least one of the hands;

(e) determining a total award by multiplying the winning hand award by a total multiplier value associated with the replaced multiplier cards displayed on the multiplier card display; and (f) providing the total award to the player.

101. The method of claim 100, wherein (a) to (f) are provided to the player through a data network.

102. The method of claim 101, wherein the data network is an internet.

103. A method of operating a gaming device, said method comprising:

(a) dealing a first draw of cards to a player where the first draw of cards forms a plurality of card hands, said first draw of cards including a number of cards randomly selected by a processor from a deck of cards including fifty-two playing cards and at least one multiplier card;

(b) replacing multiplier cards with playing cards in each of the hands after one or more multiplier cards are dealt to the player, wherein the playing cards are randomly selected by the processor from the deck of cards;

(c) displaying the replaced multiplier cards on a multiplier card display;

(d) enabling the player to independently select at least one of the cards in at least one of the hands to hold the selected card in that hand;

(e) replacing any non-selected cards with playing cards randomly selected by the processor from the deck of cards in a second draw of the cards;

(f) determining a winning hand award based on any winning card combinations indicated by the playing cards in at least one of the hands;

(g) determining a total award by multiplying the winning hand award by any multiplier values associated with each of the replaced multiplier cards displayed by the multiplier card display; and (h) providing the total multiplier to the player.

104. The method of claim 103, wherein the card hands include the same cards after the first draw of the cards.

105. The method of claim 103, wherein enabling the player to select at least one of the cards in at least one of the hands to hold the selected card in that hand further includes holding the selected card in a plurality of the hands.

106. The method of claim 103, wherein enabling the player to select at least one of the cards in at least one of the hands to hold the selected card in that hand further includes holding the selected card in all of the hands.

107. The method of claim 103, wherein replacing any non-selected cards with randomly selected playing cards picked from the deck of cards includes replacing the non-selected cards in each of the hands with cards randomly selected from the deck of cards.

108. The method of claim 103, which includes repeating steps (d) to (e) for a designated number of draws.

109. The method of claim 103, which includes repeating steps (b) to (e) for a designated number of draws.

110. The method of claim 103, which includes summing the multiplier values associated with the multiplier cards in at least one of the hands.

111. The method of claim 103, which includes multiplying the multiplier values associated with the multiplier cards in at least one of the hands.

112. The method of claim 103, wherein (a) to (h) are provided to the player through a data network.

113. The method of claim 112, wherein the data network is an internet.

114. A gaming device comprising:

a virtual deck of cards including fifty-two playing cards;

a plurality of winning card combinations, each of said card combinations including at least two of the playing cards;

a plurality of different modifiers, each associated with a modifier value;

a modifier display operable to display the modifier value associated with each of the modifiers; and a processor programmed to randomly deal a number of the cards to a player to form the player's hand, randomly determine to provide or not provide at least one of the modifiers for the hand, cause the modifier display to display the modifier value of any provided modifiers, determine any winning hand award associated with any winning card combinations included in the hand, modify the winning hand award by the displayed modifier value when the associated modifier is provided for the hand, determine a total award by multiplying the winning hand award by the displayed modifier value and provide the total award to the player.

115. The gaming device of claim 114, wherein the modifiers include a plurality of multipliers.

116. The gaming device of claim 114, which includes a probability of a modifier being provided in the hand.

117. The gaming device of claim 114, which includes a probability of being selected associated with each of the modifiers.

118. The gaming device of claim 114, which includes a plurality of draws of the cards provided to the player.

119. The gaming device of claim 118, wherein at least one modifier is provided for one of the draws of the cards.

120. The gaming device of claim 118, wherein at least one modifier is provided for a plurality of the draws of the cards.

121. The gaming device of claim 118, wherein at least one modifier is provided for all of the draws of the cards.

122. The gaming device of claim 114, which includes a plurality of hands provided to the player.

123. The gaming device of claim 122, wherein at least one modifier is provided for one of the hands.

124. The gaming device of claim 122, wherein at least one modifier is provided for a plurality of the hands.

125. The gaming device of claim 122, wherein at least one modifier is provided for all of the hands.

126. A method of playing a poker game, said method comprising:

(a) dealing a plurality of cards to a player randomly selected from a deck of cards including fifty-two playing cards to form a hand;

(b) determining whether to provide a modifier or not to provide a modifier;

(c) randomly selecting and providing at least one modifier from a group of different modifiers when it is determined that a modifier is to be provided in step (b), wherein the modifiers are each associated with a modifier value;

(d) displaying the modifier value associated with the selected modifier on a modified display;

(e) determining any winning hand award based on any winning card combinations indicated by the playing cards in the hand;

(f) determining a total award by multiplying the winning hand award by said displayed modifier value when the associated modifier is provided for the hand; and (g) providing the total award to the player.

127. The method of claim 126, wherein the modifiers include a plurality of multipliers.

128. The method of claim 126, which includes associating a probability with the likelihood of a modifier being provided in the hand.

129. The method of claim 126, which includes associating a probability of being selected with each of the modifiers.

130. The method of claim 126, which includes providing a plurality of draws of the cards to the player.

131. The method of claim 130, which includes providing at least one modifier for one of the draws of the cards.

132. The method of claim 130, which includes providing at least one modifier for a plurality of the draws of the cards.

133. The method of claim 130, which includes providing at least one modifier for all of the draws of the cards.

134. The method of claim 126, which includes providing a plurality of hands to the player.

135. The method of claim 134, which includes providing at least one modifier for one of the hands.

136. The method of claim 134, which includes providing at least one modifier for a plurality of the hands.

137. The method of claim 134, which includes providing at least one modifier for all of the hands.

138. The method of claim 126, wherein (a) to (g) are provided to the player through a data network.

139. The method of claim 138, wherein the data network is an internet.

140. The gaming device of Claim 1, which includes a modifier display operable to display the total modifier based at least partially on the modifier value associated with any displayed modifier cards.

141. The gaming device of Claim 1, wherein the modifier card display includes a plurality of card areas and is operable to display at least one replaced modifier card in the card areas.

142. The gaming device of Claim 18, which includes a multiplier display operable to display the total multiplier value based at least partially on the multiplier value associated with any displayed multiplier cards.

143. The gaming device of Claim 18, wherein the multiplier card display includes a plurality of card areas and is operable to display at least one replaced multiplier card in the card areas.

144. The gaming device of Claim 24, which includes a multiplier display operable to display the total multiplier value.

145. The gaming device of Claim 24, wherein the multiplier card display includes a plurality of card areas and is operable to display at least one replaced multiplier card in the card areas.

146. The gaming device of Claim 29, which includes a multiplier display operable to display the total multiplier value.

147. The gaming device of Claim 29, wherein the multiplier card display includes a plurality of card areas and is operable to display at least one replaced multiplier card in the card areas.

148. The gaming device of Claim 38, which includes a multiplier display operable to display the total multiplier value.

149. The gaming device of Claim 38, wherein the multiplier card display includes a plurality of card areas and is operable to display at least one replaced multiplier card in the card areas.

150. The method of Claim 50, which includes a modifier display operable to display the total modifier value based at least partially on the modifier value associated with the displayed modifier cards.

151. The method of Claim 50, wherein the modifier card display includes a plurality of card areas and is operable to display at least one replaced modifier card in the card areas.

152. The method of Claim 62, which includes a multiplier display operable to display the total multiplier value based at least partially on the multiplier value associated with any displayed multiplier cards.

153. The method of Claim 62, wherein the multiplier card display includes a plurality of card areas and is operable to display at least one replaced multiplier card in the card areas.

154. The method of Claim 70, which includes a multiplier display operable to display the total multiplier value based at least partially on the multiplier value associated with any displayed multiplier cards.

155. The method of Claim 70, wherein the multiplier card display includes a plurality of card areas and is operable to display at least one replaced multiplier card in the card areas.

156. The method of Claim 73, which includes a multiplier display operable to display the total multiplier value based at least partially on the multiplier value associated with any displayed multiplier cards.

157. The method of Claim 73, wherein the multiplier card display includes a plurality of card areas and is operable to display at least one replaced multiplier card in the card areas.

158. The method of Claim 84, which includes a modifier display operable to display the total modifier value based at least partially on the modifier value associated with any displayed modifier cards.

159. The method of Claim 84, wherein the modifier card display includes a plurality of card areas and is operable to display at least one replaced modifier card in the card areas.

160. The method of Claim 95, which includes a multiplier display operable to display the total multiplier value.

161. The method of Claim 95, wherein the multiplier card display includes a plurality of card areas and is operable to display at least one replaced multiplier card in the card areas.

162. The method of Claim 100, which includes a multiplier display operable to display the total multiplier value.

163. The method of Claim 100, wherein the multiplier card display includes a plurality of card areas and is operable to display at least one replaced multiplier card in the card areas.

164. The method of Claim 103, which includes a multiplier display operable to display the total multiplier value based at least partially on the multiplier value associated with any displayed multiplier cards.

165. The method of Claim 103, wherein the multiplier card display includes a plurality of card areas and is operable to display at least one replaced multiplier card in the card areas.

166. The gaming device of Claim 114, wherein the modifier display is operable to display the total modifier value based at least partially on the displayed modifier value of any provided modifiers.

167. The gaming device of Claim 114, wherein the modifier display includes a plurality of modifier areas and is operable to display at least one modifier in the modifier areas.

168. The method of Claim 126, wherein the modifier display is operable to display the total modifier value based at least partially on the displayed modifier value of any provided modifiers.

169. The method of Claim 126, wherein the modifier display includes a plurality of modifier areas and is operable to display at least one modifier in the modifier areas.

* * * * *

UNITED STATES PATENT AND TRADEMARK OFFICE

CERTIFICATE OF CORRECTION

PATENT NO. : 7,247,092 B2
APPLICATION NO. : 10/458809
DATED : July 24, 2007
INVENTOR(S) : Eugene P. Jarvis et al.

It is certified that error appears in the above-identified patent and that said Letters Patent is hereby corrected as shown below:

In Claim 150, Column 29, Line 7 change the phrase “with the” to --with any--.

Signed and Sealed this

First Day of April, 2008

JON W. DUDAS
*Director of the United States Patent and Trademark Office*